(12) United States Patent
Tin

(10) Patent No.: US 7,567,362 B2
(45) Date of Patent: Jul. 28, 2009

(54) EFFECTING GAMUT OPERATIONS USING BOUNDARY LINE ELEMENTS

(75) Inventor: Siu-Kei Tin, Milpitas, CA (US)

(73) Assignees: Canon Kabushiki Kaisha, Tokyo (JP); Microsoft Corp., Redmond, WA (US)

( * ) Notice: Subject to any disclaimer, the term of this patent is extended or adjusted under 35 U.S.C. 154(b) by 699 days.

(21) Appl. No.: 11/208,472

(22) Filed: Aug. 19, 2005

(65) Prior Publication Data

US 2007/0041026 A1    Feb. 22, 2007

(51) Int. Cl.
   *G03F 3/08*    (2006.01)
(52) U.S. Cl. .................... 358/1.9; 358/518; 345/590
(58) Field of Classification Search ............ 358/1.9, 358/501, 504, 518, 520; 382/162, 167; 345/589, 345/590, 591
   See application file for complete search history.

(56) References Cited

U.S. PATENT DOCUMENTS

| 5,721,572 | A  | * | 2/1998  | Wan et al. ................... 345/590 |
| 6,075,885 | A  | * | 6/2000  | Taniguchi et al. ........... 382/162 |
| 6,480,301 | B1 | * | 11/2002 | Cholewo ..................... 358/1.9 |
| 6,819,458 | B1 |   | 11/2004 | Tanaka et al. ............... 358/518 |
| 6,956,581 | B2 | * | 10/2005 | Cui et al. ..................... 345/589 |
| 7,397,588 | B2 | * | 7/2008  | Sloan et al. ................. 358/520 |

| 2004/0096104 | A1 | * | 5/2004 | Terekhov ..................... 382/167 |
| 2004/0100643 | A1 |   | 5/2004 | Jones et al. .................. 358/1.9 |

OTHER PUBLICATIONS

Ján Morovič, "To Develop A Universal Gamut Mapping Algorithm", Oct. 1998.
J. O'Rourke, "Computational Geometry", 2nd. Ed., Cambridge University Press, 1998, pp. 239-245.

* cited by examiner

*Primary Examiner*—Thomas D Lee
(74) *Attorney, Agent, or Firm*—Fitzpatrick, Cella, Harper & Scinto

(57) ABSTRACT

The present invention provides for a performing a type of gamut operation for a color device given a color input value, the color device being characterized by a gamut boundary comprising a collection of gamut boundary triangles. Boundary line elements are determined that correspond to a subset of the collection of gamut boundary triangles. The subset of the collection of gamut boundary triangles does not include gamut boundary triangles which are unlikely to yield useful results based on the type of gamut operation and the color input value. Each boundary line element represents a line segment defined by an intersection of one of the gamut boundary triangles within the subset of the collection of gamut boundary triangles with a hue plane, and the hue plane is within the gamut boundary and based on the color input value. In addition, a result is determined for the gamut operation using one or more of the determined boundary line elements. Accordingly, a type of gamut operation is performed using a descriptor which represents the gamut boundary of the color device.

29 Claims, 17 Drawing Sheets

Top View

Side View

Part of the neutral axis missing from the hue slice crossings = 1
(In Gamut)

crossings = 2
(Out of Gamut)

crossings = 4
(Out of Gamut)

EFFECTING GAMUT OPERATIONS USING BOUNDARY LINE ELEMENTS

BACKGROUND OF THE INVENTION

1. Field of the Invention

The invention relates to the field of gamut boundaries for color devices, and more particularly relates to performing gamut operations using a descriptor which represents a gamut boundary of a color device.

2. Description of the Related Art

A gamut boundary descriptor (GBD) is a description of the gamut boundary of a color device. In general, a GBD is represented as a closed surface in a 3-dimensional color space. For example, a GBD can be represented as a set of interconnected planar triangles in the 3-dimensional color space.

GBDs are employed by different gamut mapping algorithms (GMAs), which are algorithms that map colors between color devices while taking into account any differences between the color gamuts of the color devices. Each GMA is typically optimized for one particular application or directive, such as preserving colorimetric value, emphasizing saturation, or making the reproduction perceptually pleasing. It should be noted that GMAs typically operate under the assumption that the gamut boundary has been calculated and represented in some way, so that geometrical calculations can be performed.

There are several common operations required by GMAs that employ GBDs. One such operation is the check gamut operation, which determines whether a given color in color appearance space is inside the gamut boundary of a color device. Another operation is the get cusp operation, which determines a point on the gamut boundary of a color device with the largest chroma. Yet another operation is the ray intersect operation, which determines the intersection(s) with the gamut boundary of a color device with a given ray representing a directional half line.

Different approaches have been taken for implementing the foregoing operations. For example, one approach is taking hue slices of a convex hull representation of the gamut. In a color appearance space that supports the attribute of a hue, a hue slice can be defined as the intersection between a hue plane, which is a plane in the color appearance space wherein all points on it have the same hue, and the gamut boundary. It should be noted that a full hue plane actually contains 2 hues that are 180 degrees apart, so the above intersection between a gamut boundary and a hue plane actually occurs within the half-plane having the specified hue.

The convex hull representation of the gamut may provide a geometric depiction of a GBD that matches an intuitive visualization of the GBD. Moreover, a convex hull slice of the gamut may provide a unique intersection point with a ray emanating from a point on the neutral axis of the color device. However, the convex hull representation is not without its drawbacks.

First, color devices such as display devices may have gamuts that are not convex. Since the convex hull representation of a gamut assumes a convex shape, the actual gamut may deviate from the convex hull representation, leading to inaccurate results.

In addition, since a hue slice is taken along a constant hue, and since the hue slice is taken along a half plane that corresponds to the hue angle, the hue slice may contain features which the convex hull tends to overestimate. For example, color devices such as CRT devices may produce hue slices with "islands", which the convex hull would include, along with all the void space between them. Similar difficulty arises for color devices such as color printers that produce hue slices where part of the neutral axis of the color device is missing.

SUMMARY OF THE INVENTION

In view of the foregoing problems, the present invention provides for the performance of a type of gamut operation for a color device which is characterized by a gamut boundary comprising a collection of gamut boundary triangles. Boundary line elements are determined that correspond to intersections of gamut boundary triangles within a subset of the collection of gamut boundary triangles with a hue plane, where the hue plane is within the gamut boundary and based on a color input value. A result is determined for the gamut operation using one or more of the determined boundary line elements.

According to one aspect of the invention, a type of gamut operation is performed for a color device given a color input value, the color device being characterized by a gamut boundary comprising a collection of gamut boundary triangles. Boundary line elements are determined that correspond to a subset of the collection of gamut boundary triangles. The subset of the collection of gamut boundary triangles does not include gamut boundary triangles which are unlikely to yield useful results based on the type of gamut operation and the color input value. Each boundary line element represents a line segment defined by an intersection of one of the gamut boundary triangles within the subset of the collection of gamut boundary triangles with a hue plane. The hue plane is within the gamut boundary and based on the color input value. In addition, a result is determined for the gamut operation using one or more of the determined boundary line elements.

According to an additional aspect of the invention, the color input value can be a query color, and the type of gamut operation can be a check gamut operation in which the determined result is an indication of whether the query color falls within the gamut boundary of the color device. An upward ray can be calculated that begins at the query color and that travels in an upward direction relative to the gamut boundary.

In this aspect of the invention, the gamut boundary triangles which are unlikely to yield useful results can be filtered prior to determining the boundary line elements. The filtering can include determining, for each gamut boundary triangle within the collection of gamut boundary triangles, whether the upward ray intersects a box which bounds the vertices of the gamut boundary triangle, and removing the gamut boundary triangles which do not intersect the upward ray. The box which bounds the gamut boundary triangle can be enlarged by a preset tolerance.

Also in this aspect of the invention, determining a result can include tallying a number of boundary line elements that the ray intersects, determining, in a case where the number is odd, that the query color falls within the gamut boundary, and determining, in a case where the number is even, that the query color does not fall within the gamut boundary.

According to an additional aspect of the invention, the color input value can be a hue angle, and the type of gamut operation can be a get cusp operation in which the determined result represents a point on the gamut boundary having the hue angle, the point having a maximum chroma among all points on the gamut boundary having the hue angle. A boundary line element can be determined for a first one of the collection of gamut boundary triangles, the end points of the boundary line element can be used to initialize a current maximum chroma value, and a chroma value can be computed for the vertices of each of the gamut boundary triangles within the collection of gamut boundary triangles.

In this aspect of the invention, determining the boundary line elements that correspond to the subset of the collection of gamut boundary triangles can include comparing the current maximum chroma value with the computed chroma values of each gamut boundary triangle until one of the computed chroma values is greater than the current maximum chroma value, and determining a boundary line element for the gamut boundary triangle with a computed chroma value greater than the current maximum chroma value, wherein end points of the boundary line element are used to reset the current maximum chroma value if the end points correspond to a chroma which is greater than the current maximum chroma value. The comparing and determining are repeated for all of the gamut boundary triangles. The determination of a result can include returning the end point of the boundary line element corresponding to the current maximum chroma value.

According to an additional aspect of the invention, the color input value can be an input ray which lies within a hue plane of the gamut boundary, and the type of gamut operation can be a ray intersect operation in which the determined result represents a point at which the input ray intersects the gamut boundary, the point having a maximum chroma among all points at which the input ray intersects the gamut boundary. A color space of the color device can be associated with color components, each color component can define a hyper-plane that divides a whole color space into two half spaces, and a color component ray can be calculated by projecting the input ray into one of the two half spaces for each color component.

In this aspect of the invention, the gamut boundary triangles which are unlikely to yield useful results can be filtered prior to determining the boundary line elements. The filtering of gamut boundary triangles can include determining, for each gamut boundary triangle within the collection of gamut boundary triangles, whether all of the vertices of the gamut boundary triangle lie within a half space which does not contain one of the color component rays, and removing the gamut boundary triangles having all vertices lying within a half space which does not contain one of the color component rays. The half space which does not contain a color component ray can be reduced by a preset tolerance value.

Also in this aspect of the invention, determining a result can include calculating an intersection point for each of the boundary line elements with the input ray, and returning the intersection point with a largest chroma.

The intersection of one of the subset of the collection of gamut boundary triangles with the hue plane can be calculated using integer values for geometrical consistency. In addition, the intersection of one of the subset of the collection of gamut boundary triangles with the hue plane can be calculated using a dot product of the vertices of the gamut boundary triangle and a quantized normal vector of the hue plane. The dot product can cached. In a case where the type of gamut operation confines input and output on a same hue plane, a hue smoothing can be applied to the collection of gamut boundary triangles prior to intersection with the hue plane. The hue smoothing can be applied by taking the convex hull of the collection of gamut boundary triangles.

According to another aspect of the invention, a minimum color difference mapping operation is performed for a color device given a color input value, the color device being characterized by a gamut boundary comprising a collection of gamut boundary triangles. A determination is made if the color input value is within the gamut boundary. In a case where the color input value is not within the gamut boundary, a point is calculated within the gamut boundary which is nearest to the color input value. Calculations are not repeatedly performed for edges and vertices shared by any of the gamut boundary triangles within the collection of gamut boundary triangles. In addition, calculations are only performed for gamut boundary triangles which are determined to yield improved points based on previous calculations.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
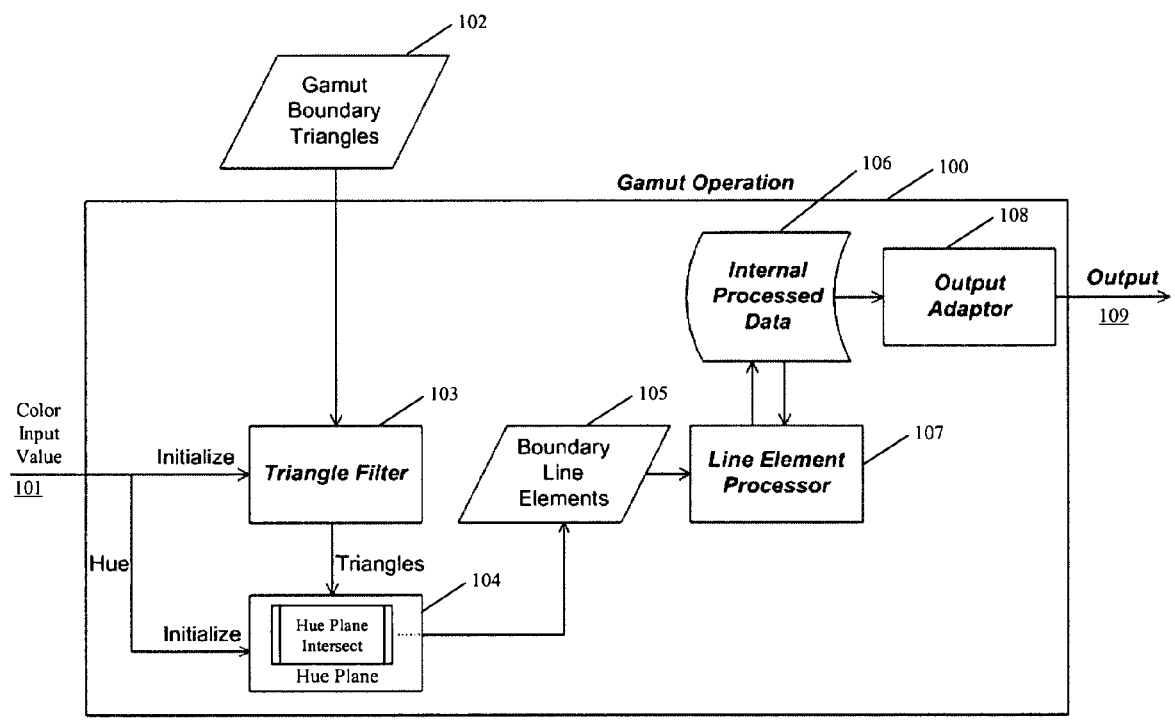
FIG. 1 is a diagram of a gamut operation module for performing a type of gamut operation in accordance with an exemplary embodiment of the present invention.

Referring now to FIG. 1, a diagram of a gamut operation module for performing a type of gamut operation in accordance with an exemplary embodiment of the present invention is shown. Gamut operation module 100 represents a module for performing different types of gamut operations. Such operations include, but are not limited to, a check gamut operation, a get cusp operation and a ray intersect operation.

The gamut operation module receives a color input value 101 as input. Color input value 101 typically corresponds to a set of color attributes for which a gamut operation is performed, and is based on the type of gamut operation performed. The gamut operation module can also access a collection of gamut boundary triangles 102, which corresponds to a GBD. As noted above, a GBD is a representation of a gamut boundary of a particular color device. The collection of gamut boundary triangles will be described in more detail below, with reference to FIG. 2.

Still referring to FIG. 1, a hue angle can be obtained directly from the color input value 101, or can be computed from the color input value 101. This hue angle is used to initialize a hue plane for hue plane module 104, with the hue plane being a plane in the color appearance space wherein all points on it have the same hue. As noted above, a full hue plane contains 2 hues that are 180 degrees apart, with only one half-plane having a specified hue. The hue plane of this exemplary embodiment is preferably a full hue plane which contains both the input hue angle and the angle 180 degrees opposite to it.

The hue plane module 104 also contains a hue plane intersect operation, which is used to determine boundary line elements 105. Each of the boundary line elements 105 represents a line segment defined by an intersection of a gamut boundary triangle with the hue plane. In other words, the boundary line elements represent a set of line segments which lie on the gamut boundary and which also lie on the hue plane of hue plane module 104. A description of calculating a line segment will be described in more detail below, with reference to FIG. 3. It should be noted that boundary line elements 105 are preferably not calculated for all of the gamut boundary triangles 102, since some gamut boundary triangles 102 may be filtered out.

Triangle filter module 103 is used to determine which gamut boundary triangles are not likely to yield useful results. This determination is based on the type of gamut operation performed and the hue plane. The gamut boundary triangles which are unlikely to yield useful results are filtered out by triangle filter module 103. By filtering out these gamut boundary triangles, the number of intersections calculated between gamut boundary triangles and the hue plane is reduced. Since determining this intersection can be a relatively expensive operation calculation, the reduction of gamut boundary triangles is seen to improve efficiency.

Provided that at least one boundary line element is determined (i.e., at least one gamut boundary triangle intersects the hue plane), the boundary line element values are passed onto a line element processor module 107, which in turn can update an internal data structure included in internal processed data module 106. The internal data structure within internal processed data module 106 typically represents a current result for the gamut operation, where the current result can be updated as new boundary line elements are determined. When all of the boundary line elements have been processed, the result for the gamut operation has been found, and the result is provided to an output adaptor module 108. The output adaptor module 108 provides the output for the gamut operation module 100. It should be noted that the line element processor module 107, the internal processed data module 106 and the output adapter module 108 can handle the boundary line elements 105 in different manners, depending on the type of gamut operation that is performed.

Figure 2:
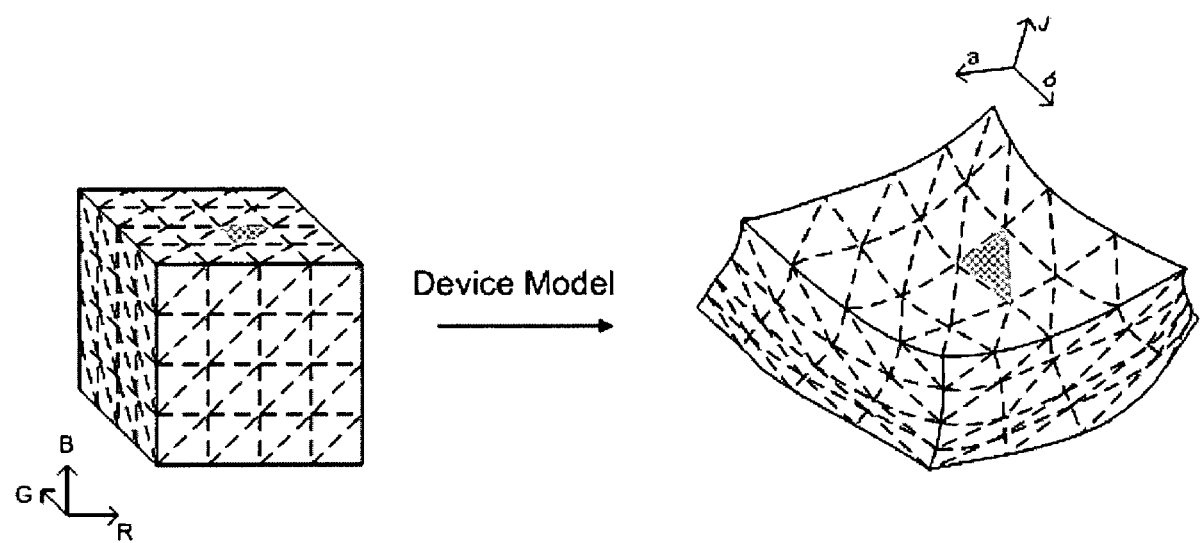
FIG. 2 is a diagram of an exemplary gamut boundary descriptor (GBD) represented as a collection of gamut boundary triangles.

Referring now to FIG. 2, a diagram of an exemplary gamut boundary descriptor (GBD) represented as a collection of gamut boundary triangles is shown. The collection of gamut boundary triangles can correspond to block 102 of FIG. 1, and consists of a triangulation of the gamut boundary. Although this exemplary embodiment of the preset invention is not limited to any particular method for constructing the GBD, one method for additive devices with the RGB cube as a device dependent color space will be described with reference to FIG. 2.

Additive devices which employ the RGB color space include monitors (e.g., CRT and LCD) and projectors. The simple geometry of the RGB cube allows a regular lattice on the cube to be introduced. The boundary faces of the cube can be triangulated in a number of different manners, with FIG. 2 representing one configuration of triangles.

When representing the triangulated RGB cube in device independent color space, it can be assumed that either a device model has been built for the color device so that colorimetric values of the lattice points can be obtained algorithmically, or it can be assumed that measurements have been made directly for those points. It can be further assumed that the device independent color space, typically a uniform color space such as CIELAB or a color appearance space such as CIECAM02, has been chosen and that a transformation from colorimetric space (e.g., XYZ) to the device independent color space has been set up.

Given the foregoing information, each lattice point on the boundary faces of the RGB cube can have a corresponding point in the uniform color space which corresponds to the device independent color space. In addition, the connections of points that form the set of triangles in RGB space can also result in a set of triangles in the uniform color space. This set of triangles would form a reasonable triangulation of the gamut boundary provided that two conditions are met. First, the lattice on the RGB cube should be sufficiently fine. Second, the transformation from the device dependent color space (e.g., RGB) to the device independent color space (e.g., the uniform color space) should be topologically well-behaved. In other words, such transformation should map from gamut boundary to gamut boundary, and the transformation should not turn the gamut boundary inside out so that interior points become gamut boundary points.

Figure 3:
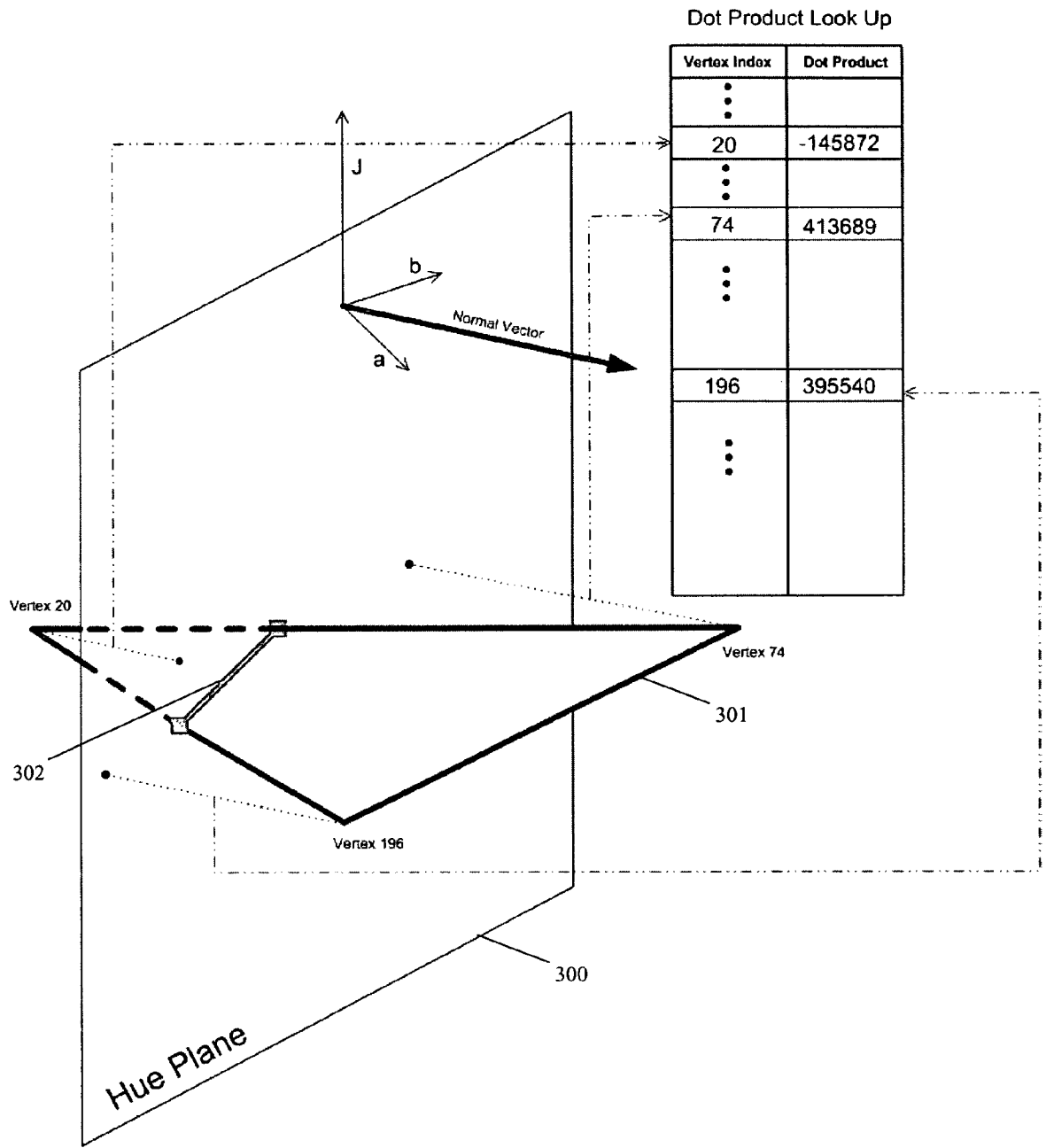
FIG. 3 is a diagram illustrating an example of a line segment formed by intersecting a gamut boundary triangle with a hue plane in accordance with an exemplary embodiment of the present invention.

Turning now to a description of the boundary line elements 105, FIG. 3 illustrates an example of a line segment formed by intersecting a gamut boundary triangle with a hue plane in accordance with an exemplary embodiment of the present invention. In this example, a line segment 302 is defined by the intersection of a gamut boundary triangle 301, having vertices 20, 74 and 196, with a hue plane 300. In calculating the line segment, certain considerations may be taken into account.

A first consideration is that an implementation which simply intersects each edge of a gamut boundary triangle with the hue plane may yield 3 intersection points, a geometrically impossible situation. The reason why this may happen in the computation is that, when calculations are done using floating point values (e.g., IEEE format), there are uncertainties such as numerical noise in every step which may affect the final conclusion of whether an edge of the gamut boundary triangle intersects the hue plane or not. When the hue plane intersects the edges in a near-miss situation, the intersection points are close to each other, and the determination whether an intersection point lies within or without the edge is typically random. Although noise in the numerical values of the points is small, the qualitative conclusion that there are more than 2 intersection points is geometrically impossible, and also difficult to handle correctly.

In addition to the possibility of calculating 3 intersection points, another consideration which may be taken into account when implementing a function for calculating the line segment is the efficiency of the calculation. Since the calculation of line segments is performed for each of the gamut boundary triangles which is not removed by the triangle filter 103, it is preferred that this calculation be efficient.

To reduce the likelihood of calculating 3 intersection points, calculations are preferably performed using integers. To improve the efficiency of calculating the intersection, the "dot product" associated with each vertex is preferably cached. A description of calculating a line segment will now be described.

Using integers for calculating the intersection virtually guarantees geometrical consistency. The basic idea is if quantization is needed, it should be done in the beginning. Subsequent calculations can then be done in integers, and if the integers are wide enough so that there is no danger of overflow, the calculations can be done with virtually infinite precision. This exemplary embodiment of the present invention uses of the following quantization function:

ScaleAndTruncate($x$)=Integer part of $x*10000$ (Equation 1)

In Equation (1), the scaling factor of 10000 indicates that 4 decimal places are kept in the input floating point number, which should be sufficient for the calculation of the line segment. Depending on the range of values of the color appearance space, an integer type should also be chosen with bits wide enough to hold intermediate calculations.

In most color appearance spaces, the range of each coordinate is from −1,000 to 1,000. Thus, the quantized coordinate has a maximum possible absolute value of 1,000*10,000=10,000,000. In addition, the intermediate quantity is a dot product, which is a sum of 2 products of coordinates. In this case, the dot product has a maximum possible absolute value of $2*(10,000,000)^2 = 2 \times 10^{14}$. The number of bits required is $\log_2 (2 \times 10^{14}) = 47.51$. Therefore, a convenient choice for the integer type is 64-bit integers.

To virtually guarantee that intersecting a hue plane with a gamut boundary triangle will give either an empty set or a set of 2 points, the gamut boundary triangle should be considered as a whole, rather than as separate individual edges of the gamut boundary triangle. The geometrical situation can be understood by considering the "signed distances" of the vertices of the gamut boundary triangle from the hue plane. These signed distances do not necessarily have to be calculated directly. Instead, dot products can be calculated of the position vectors for the vertices with the quantized normal vector to the plane. More specifically, during the initialization of the hue plane, the quantized normal vector can be calculated as:

NormalVector=(ScaleAndTruncate(−sin(hue)), ScaleAndTruncate(cos(hue))) (Equation 2)

In Equation (2), it should be noted that the calculated vector is a 2-dimensional vector. A 2-dimensional vector can be employed because the hue plane is vertical, with the third component of the normal vector being 0. Moreover, a look-up table of dot products is initialized to have an entry for each vertex from the gamut boundary triangles, with each dot product entry initially being set to an invalid value.

During one operation of intersecting the hue plane with a gamut boundary triangle, the dot product of each vertex of the gamut boundary triangle is looked up. If the value in the look-up table is the invalid value, then the dot product is computed using the following expression:

(a component of NormalVector)*ScaleAndTruncate(a component of vertex)+(b component of NormalVector)*ScaleAndTruncate(b component of vertex) (Equation 3)

Presuming that the device independent color space is Jab, and since the normal vector is horizontal, the J-component of the vertex is not used. The calculated dot product is then cached in the look-up table so that it does not need to be computed again if queried later.

The look-up table is progressively built up as the vertices are processed. Caching allows for a generally quick determination of whether an edge intersects the hue plane, once the dot products are tabulated in the look-up table.

Still referring to FIG. 3, in order for the gamut boundary triangle 301 to intersect the hue plane 300 in a non-degenerate line segment, the dot products of the vertices (i.e. vertices 20, 74 and 198), when sorted in ascending order, must be in one of the following patterns:

0,0,+;−,0,0;−,0,+;−,−,+;−,+,+

An end point of the line segment arises from intersecting the hue plane 300 with an edge with vertices that have different signs in the dot product. If the sign is 0, then the vertex lies right on the plane, and the intersection of the edge with the plane is the vertex itself.

It should be noted that the cases 0,0,0;−,−,0;0,+,+ are not necessarily reported. This is because the case of 0,0,0 indicates the whole triangle lies on the plane. In such a case, each edge of the triangle should belong to a neighboring triangle which also should not lie entirely on the plane. The edge will then be reported when that gamut boundary triangle is considered. The cases −,−,0 and 0,+,+ correspond to the geometrical configuration that the triangle touches the hue plane in one vertex. Such cases are not seen to give rise to a non-degenerate line segment.

The above description is seen to determine which edge(s) should be used calculating an intersection between the edge of the gamut boundary triangle and the hue plane. Once an edge is determined, the intersection can be calculated using parametric equations. Assuming that both dot products of the vertices of the edge are non-zero (if one of them is zero, the intersection is the vertex itself and no calculation is required), vertex1 can be set as the vertex with negative dot product dotProduct1, and vertex2 can be set as the vertex with positive dot product dotProduct2. This order is seen to ensure that the calculated intersection point does not depend on how the ordering of the vertices appears in the representation of the edge. The geometrical concept of the edge is symmetrical with respect to its vertices, where the computational aspect of using parametric equations of the edge introduces asymmetry (choice of starting vertex), which may again give a slightly different intersection point due to numerical noise and conditioning of the linear equations to be solved. As such, the intersection point, intersection, is given by:

$t$=dotProduct1/(dotProduct1−dotProduct2) (Equation 4)

J component of intersection=(J component of vertex1)+$t$*(Jcomponent of vertex2−J component of vertex1) (Equation 5)

$a$ component of intersection=($a$ component of vertex 1)+$t*$($a$ component of vertex2−$a$ component of vertex1)     (Equation 6)

$b$ component of intersection=($b$ component of vertex 1)+$t*$($b$ component of vertex2−$b$ component of vertex1)     (Equation 7)

Thus, after a line segment has been calculated for each gamut boundary triangle that is not removed, the line segments are used as the basic conceptual objects for performing the gamut operation. It should be noted that although the relationship among the various line segments can be analyzed, it is not necessary in this exemplary embodiment of the present invention to analyze their relationship. Instead, the line segments themselves can be used for performing the gamut operation.

Figure 4A:
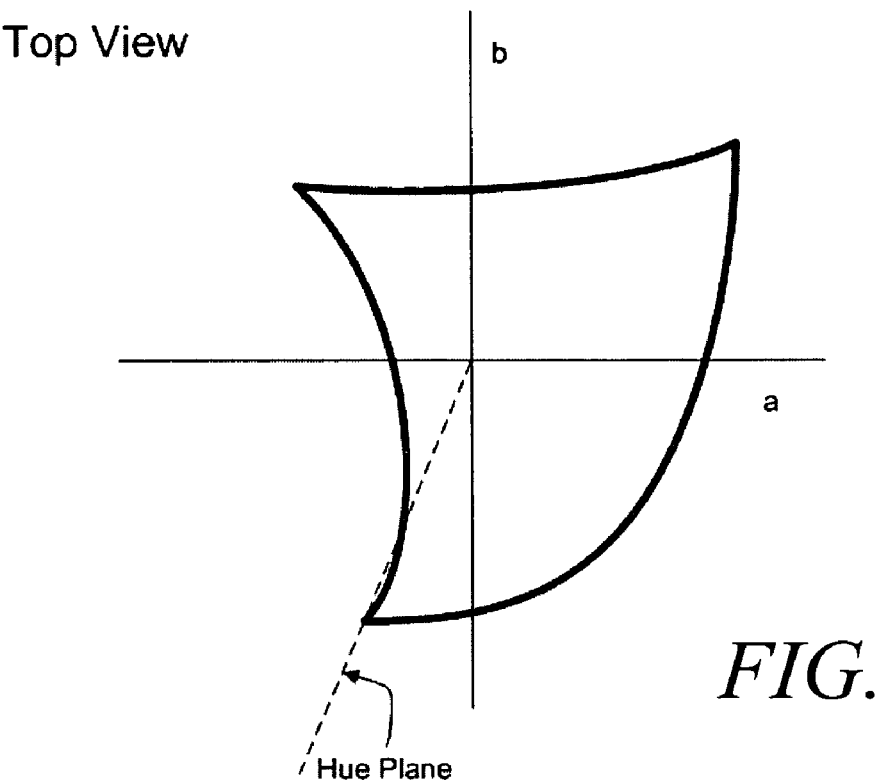
FIGS. 4A and 4B illustrate an exemplary gamut boundary in which an island appears.
Figure 4B:
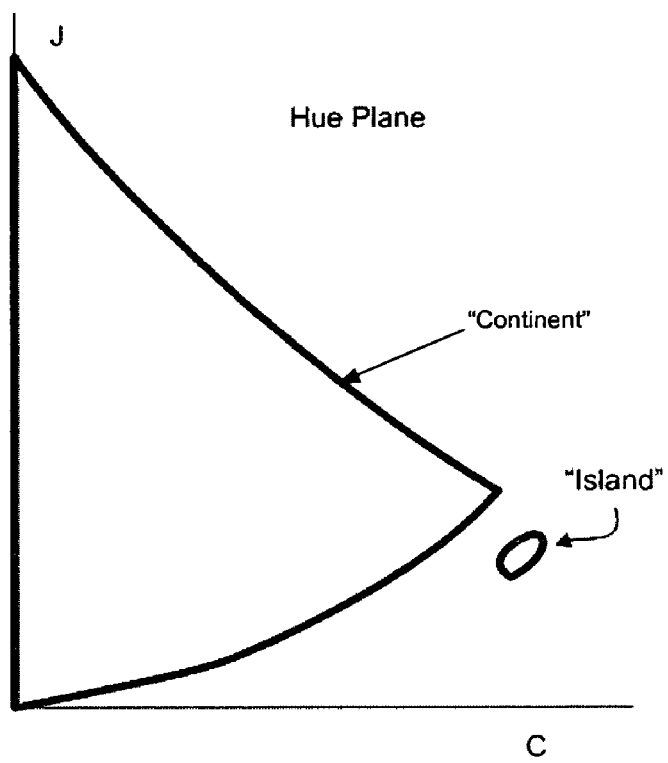
Figure 5:
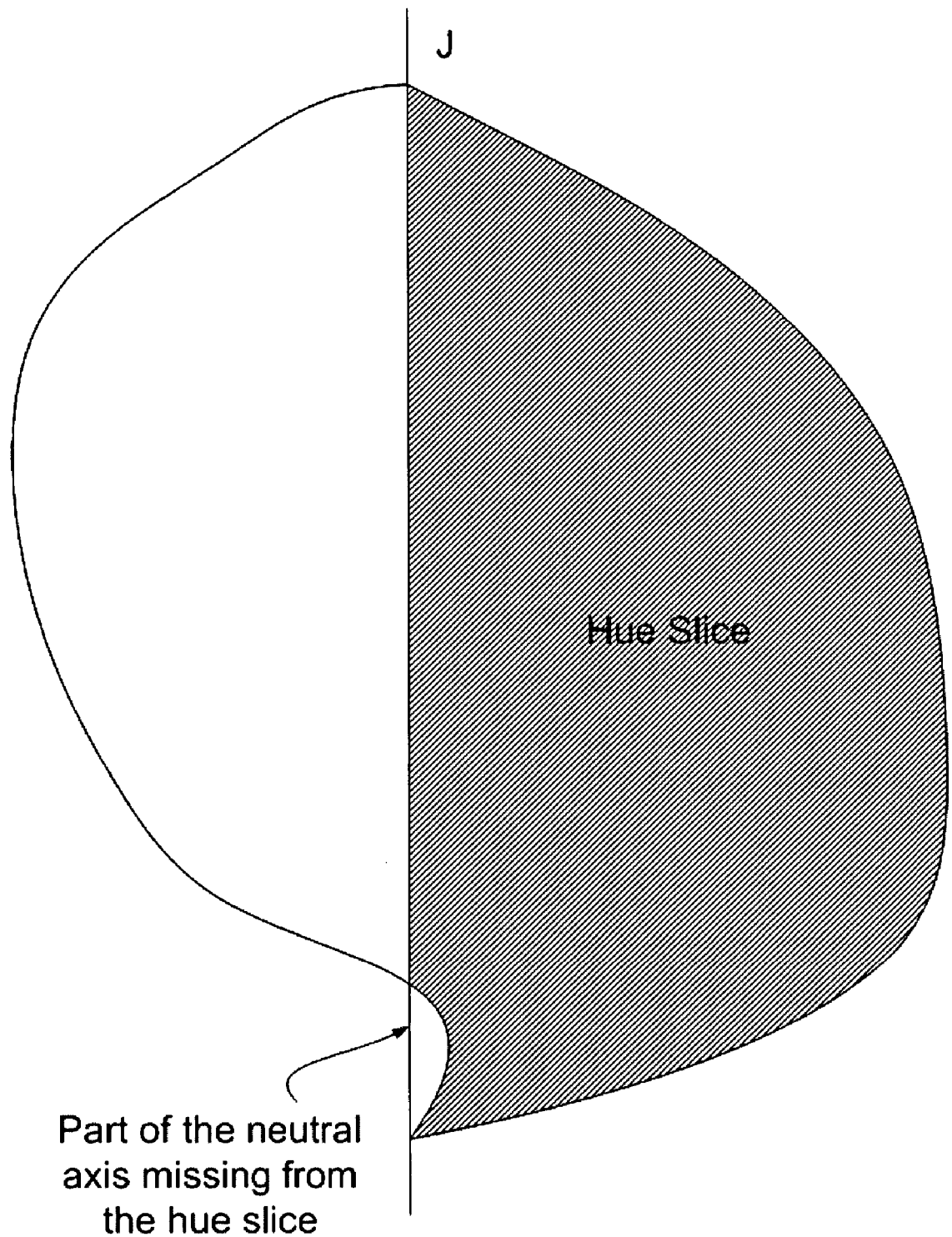
FIG. 5 illustrates an exemplary gamut boundary in which a gap appears in the neutral axis of a color device.

In this regard, FIGS. 4A, 4B and 5 illustrate certain scenarios in which analyzing the relationship among the various line segments may possibly lead to inaccurate results. More specifically, a coherent geometrical object, such as a hue slice, can be calculated by many practitioners by following the line segments. The line segments can be followed one after the other until a whole hue slice is obtained.

FIGS. 4A and 4B illustrate an exemplary gamut boundary in which an island appears. Such a gamut boundary may correspond, for example, with a CRT device. Approaches to performing gamut operations by constructing a hue slice often assume that by starting out with one line segment, following the line segment to a next line segment, and following the next line segment to subsequent line segments until returning to the starting line segment, a whole hue slice can be constructed. However, this approach may miss the island of FIGS. 4A and 4B, or in some situations, may miss the continent of FIGS. 4A and 4B.

FIG. 5 illustrates an exemplary gamut boundary in which a gap appears in the neutral axis of a color device. Such a gamut boundary may correspond, for example, with a printer device. In this situation, a hue slice may be an inappropriate concept, due to the fact that it includes only one hue angle, and not the one 180 degrees opposite to it, causing the resulting hue slice to contain a gap on the neutral axis. Insisting on constructing a hue slice by following the line segments may also yield inaccurate results.

It should be noted that by removing certain gamut boundary triangles using the above-mentioned triangle filtering, it may not be able to construct a hue slice, since some line segments may be missing. However, this exemplary embodiment of the present invention does not necessarily require that the hue slice be calculated in order to perform the desired type gamut operation. In addition, the filtering of certain ones of the gamut boundary triangles is seen to improve performance of the gamut operations.

Up to this point, a general description for performing a type of gamut operation has been described, in which the input, filtering of gamut boundary triangles and determining of a result are discussed with reference to a general type of gamut operation. Descriptions will now be provided for the specific operations of check gamut, get cusp and ray intersect.

With reference to the check gamut operation, check gamut determines whether a query color in color appearance space is inside the gamut boundary of a color device. With reference to FIG. 1, the color input value 101 for the check gamut operation is the query color, which represents a point in the color appearance space. The basic algorithm used for check gamut is to project a ray that starts from the query point and points upwards (e.g., J-direction in Jab space), and to count the number of times that this ray crosses the gamut boundary. If the number is even, then the query color is outside of the gamut boundary. If the number is odd, then the query color point is inside the gamut boundary.

Although this algorithm can in principle be implemented in 3D, degenerate situations such as the ray lying partly on a gamut boundary triangle, and lower dimensional degeneracy such as the ray lying partly on an edge of a gamut boundary triangle make implementation in 3D difficult. These degenerate situations also exist in 2D, but they can be satisfactorily handled with less difficulty in 2D.

Accordingly, for a given query color in Jab, a hue angle h can determined by:

$$h = \mathrm{atan}(b/a) \quad \text{(Equation 8)}$$

In equation (8), a and b represent the a and b components of the query color in Jab. The hue plane can be initialized using query color. In addition, the boundary line elements corresponding to this hue plane can be determined.

The triangle filter module 103 for check gamut takes into consideration that boundary line elements are only relevant if they intersect the upward ray. Accordingly, the triangle filter module 103 removes triangles that are likely to produce line elements that do not intersect the upward ray.

Figure 6:
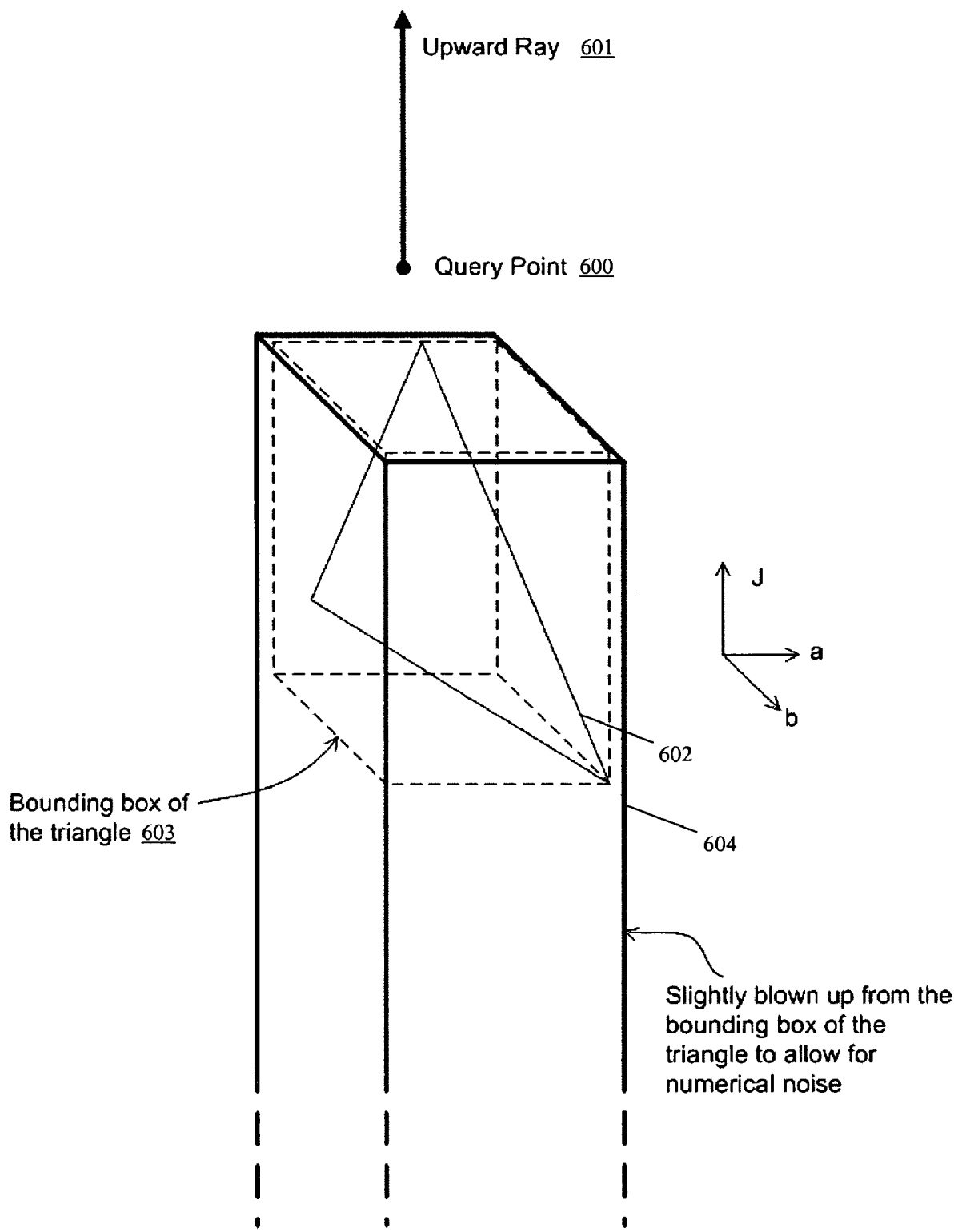
FIG. 6 is a diagram illustrating the filtering of a gamut boundary triangle for a check gamut operation in accordance with an exemplary embodiment of the present invention.
Figure 7A:
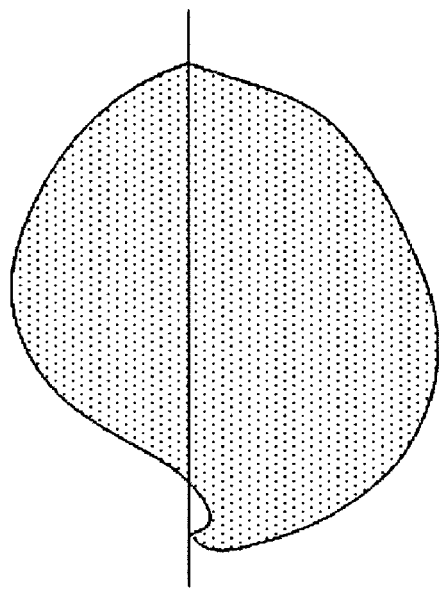
FIGS. 7A to 7D illustrate the determination of a result for a check gamut operation in accordance with an exemplary embodiment of the present invention.
Figure 7B:
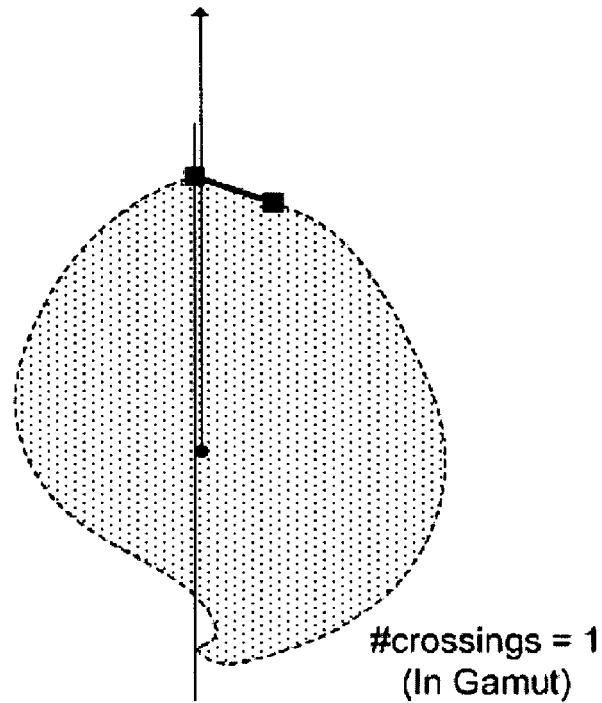
Figure 7C:
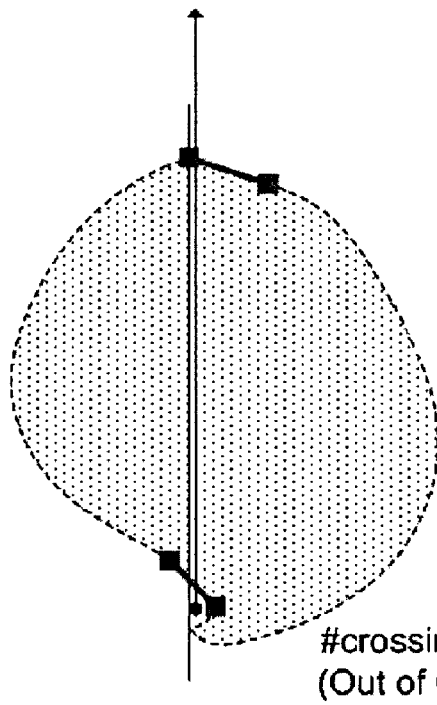
Figure 7D:
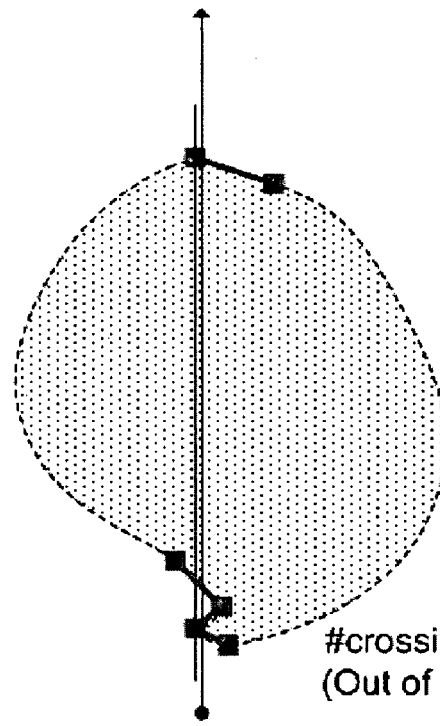

For example, with reference to FIG. 6, a diagram illustrating the filtering of a gamut boundary triangle for a check gamut operation in accordance with an exemplary embodiment of the present invention is shown. The upward ray 601 projecting from the query point 600 would not intersect the gamut boundary triangle 602 if the query point is outside bounding box 603, where bounding box 603 bounds the vertices of the gamut boundary triangle 602. Bounding box 603 can be inflated slightly by a pre-fixed tolerance to allow for numerical noise, so that gamut boundary triangles that may give useful line elements are not inadvertently removed. The result is the semi-infinite rectangular cylinder 604. Checking whether the query point 600 is inside or outside this cylinder 604 can be efficiently implemented using simple inequalities.

Referring back to FIG. 1, the internal processed data module 106 of check gamut includes a list of line elements which have been processed by line element processor module 107. In this case, the line element processor module 107 simply adds a line element to the list. The internal data structure for the internal processed data module 106 can be a linked list, or an array that can grow in size, for example.

The output adaptor module 108 for check gamut is a module that first accesses the list of line elements, and determines if a line element crosses the upward ray (count 1) or not (count 0). Summing all these counts gives a total count. The output adaptor module 108 determines a result of "yes" (in gamut) or "no" (out of gamut) depending on whether the total count is odd or even.

FIGS. 7A to 7D illustrate the determination of a result for a check gamut operation in accordance with an exemplary embodiment of the present invention. More specifically, the resulting line elements of a sample gamut with the query point in various positions is shown. In determining whether a line element crosses the upward ray, degeneracy and over-counting should be considered. For a line element to cross the ray, the right end point (the end point with larger chroma) must be strictly on the right hand side of the ray. This typically ensures that, if an end point ever lies exactly on the ray, it is only counted once. The same rule is also seen to solve the degenerate situation where the line element lies exactly on the ray. The count is not incremented for such a line element.

Turning now to the get cusp operation, get cusp determines, for a given hue angle, the point on the gamut boundary of a color device with the largest chroma. The cusp at a hue angle h is defined as the point on the gamut boundary that has the hue angle h, and that has maximum chroma among all the gamut boundary points with the same hue angle.

With reference to FIG. 1, the color input value 101 for get cusp is the hue angle itself, and the internal processed data module 106 includes the "best" cusp found so far. In addition, line element processor module 107 does not necessarily build a list of line elements. Instead, line element processor module 107 takes the 2 end points of the line element that come out of the hue plane intersect operation of hue plane module 104, compares each end point with the a current cusp in internal processed data module 106, and updates the current cusp only if the new end point has a larger chroma.

It should be noted that the end points may not have the same hue angle as the requested hue. In fact, the hue could be 180 degrees opposite. Accordingly, the current cusp should only be updated if the hue angle agrees with the requested hue, and if the chroma is larger than the current cusp in internal processed data module 106. The output adaptor module 108 is simply a module that retrieves the result saved in the internal processed data module 106.

With reference to the triangle filter module 103 for get cusp, the chroma of each vertex of a gamut boundary triangle is preferably pre-computed. As such, it is efficient to find the maximum among them.

Figure 8:
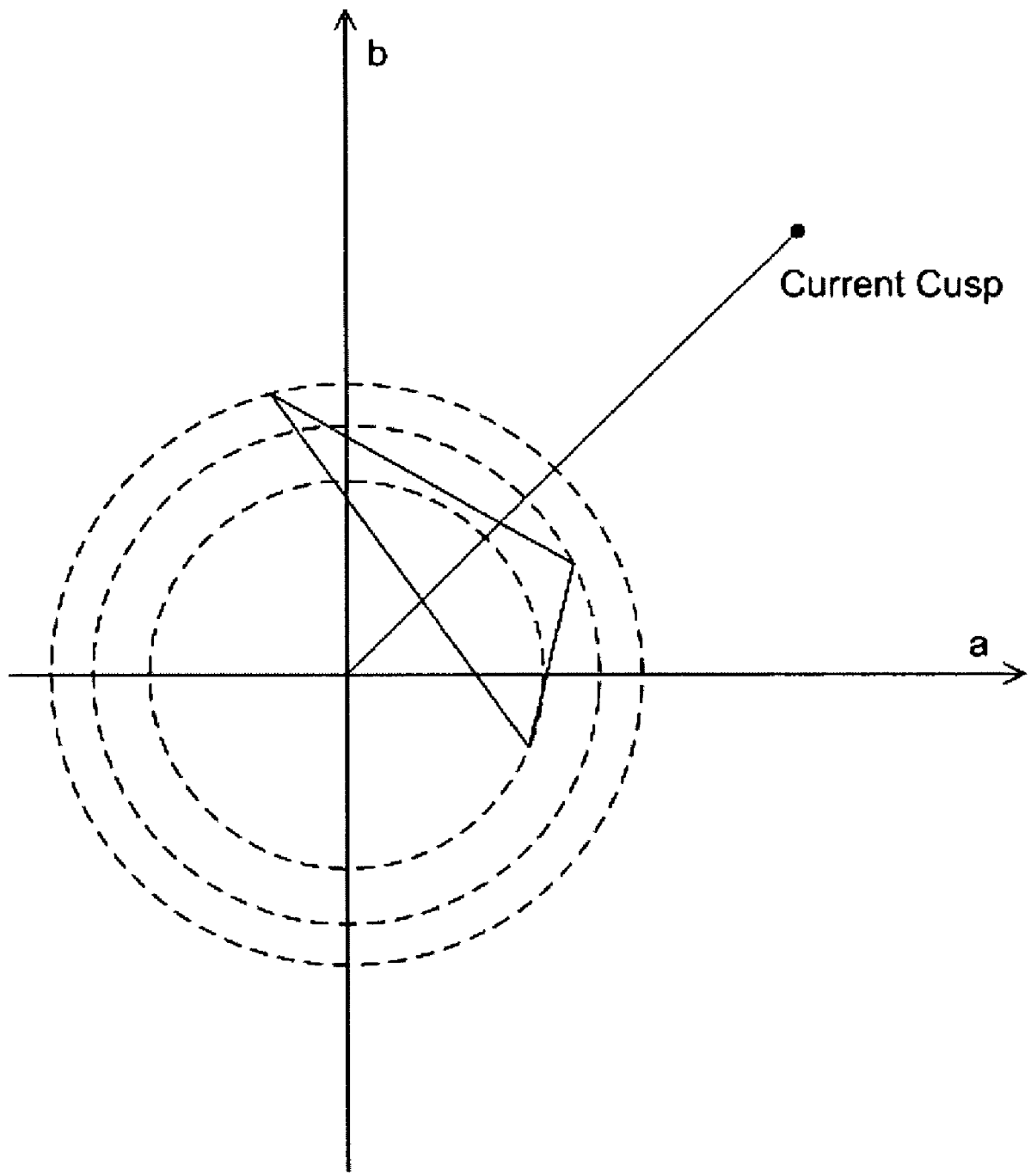
FIG. 8 is a diagram illustrating the filtering of a gamut boundary triangle for a get cusp operation in accordance with an exemplary embodiment of the present invention.

With reference to FIG. 8, a diagram illustrating the filtering of a gamut boundary triangle for a get cusp operation in accordance with an exemplary embodiment of the present invention is shown. If the maximum chroma among the vertices of a gamut boundary triangle is not greater than the chroma of a current cusp stored in internal processed data module 106, it is unlikely that the gamut boundary triangle can have an intersection with the hue plane that gives a larger chroma. This is because the entire gamut boundary triangle is contained in a circular cylinder (or a circle when viewed from top), while the stored current cusp is outside the cylinder.

Turning now to the ray intersect operation, ray intersect determines the intersection(s) with the gamut boundary of a color device for a given ray representing a directional half line. In other words, the operation is to find the intersection of a ray, which emanates from a point on the neutral axis and which entirely lies within one hue (half) plane, with the gamut boundary. If there is more than one intersection, the one with largest chroma will be returned.

The ray intersect operation is used, for example, in the SGCK gamut mapping algorithm. A point on the neutral axis can be a cusp lightness of the destination gamut at a hue angle in question. The ray connects this point to the color that is to be gamut mapped. The same ray is intersected with both the source gamut and destination gamut.

With reference to FIG. 1, the color input value 101 for ray intersect is the ray. As noted above, the ray is required to lie completely on one hue plane, so that the hue angle is implicitly contained in the ray. The internal processed data module 106 includes a list of boundary line elements, and line element processor module 107 includes the process of adding a line element to the list. The output adapter module 108 of ray intersect will take each line element in the completed list, and intersect it with the ray. The output adapter module 108 has an internal variable to save the result of intersection, and the internal variable is updated whenever a new intersection is found with a larger chroma (in case of multiple intersections).

Regarding the triangle filter module 103, the triangle filter for ray intersect is implemented using the idea of hyperplane separation. For example, when Jab is used as the device independent color space, each of the J, a, and b components define a hyperplane that divides a whole space into two half spaces. If the ray lies in one half space and the triangle lies completely in the other half, the triangle will not likely yield useful line elements that intersect the ray.

Figure 9A:
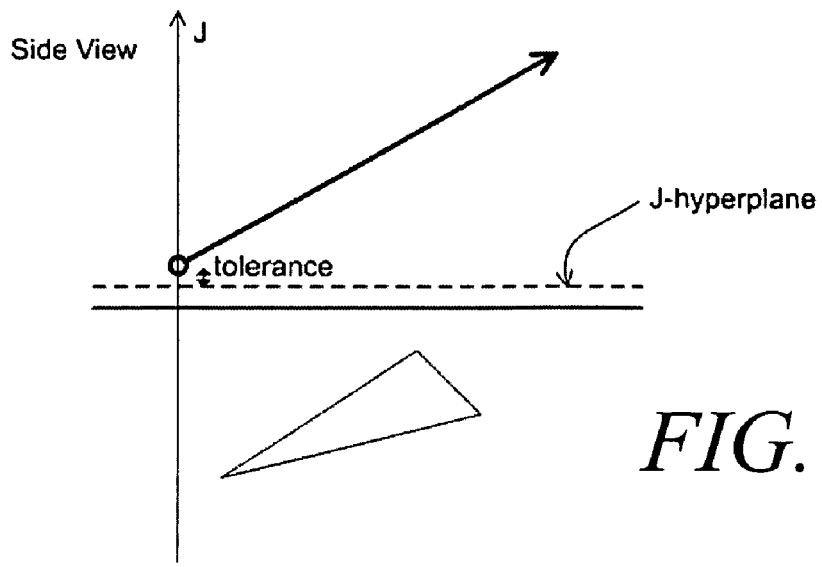
FIGS. 9A to 9C illustrate the filtering of a gamut boundary triangle for a ray intersect operation in accordance with an exemplary embodiment of the present invention.
Figure 9B:
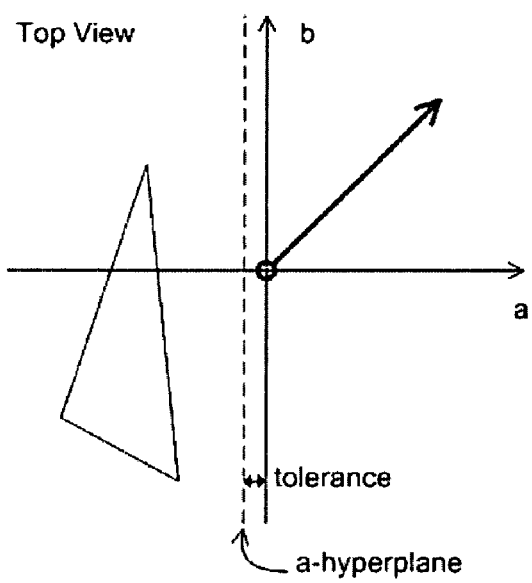
Figure 9C:
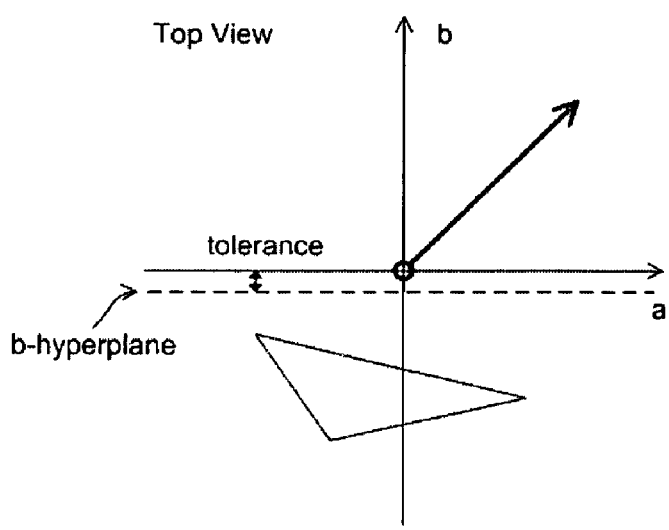

FIGS. 9A to 9C illustrate the filtering of a gamut boundary triangle for a ray intersect operation in accordance with an exemplary embodiment of the present invention. In FIGS. 9A to 9C, 3 filters are depicted, each filter being constructed respectively from the J, a and b components of the Jab color space. To allow for numerical noise, a forbidden region for each filter can be slightly reduced using a preset tolerance. A triangle is removed if its vertices lie in one of the 3 forbidden regions.

Figure 10A:
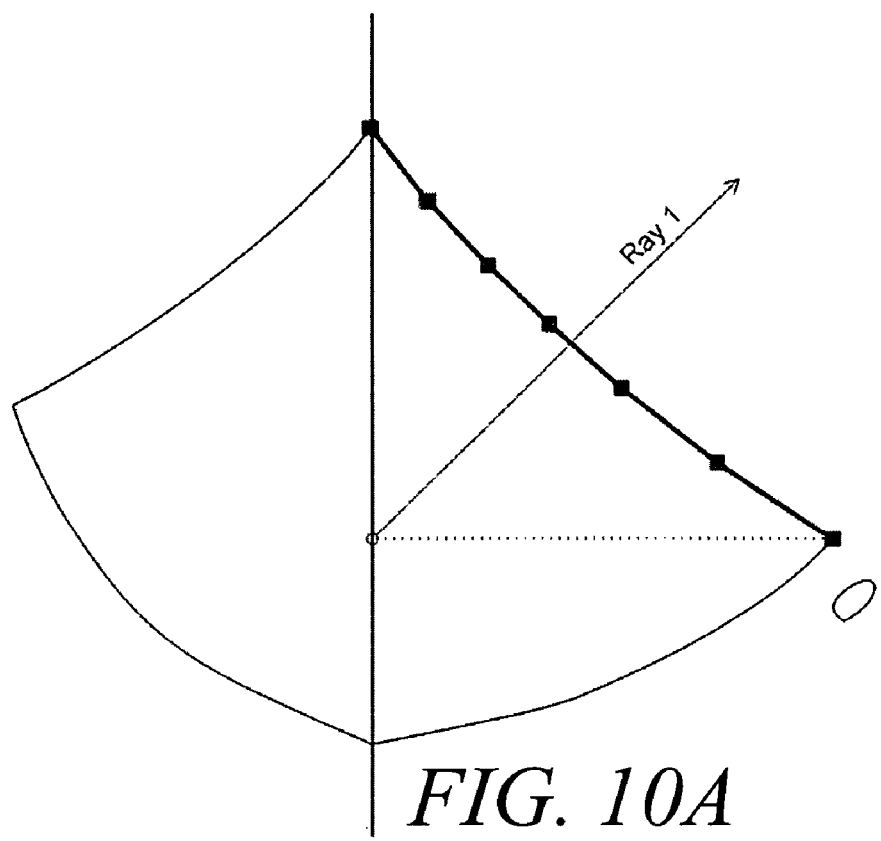
FIGS. 10A and 10B illustrate the determination of a result for a ray intersect operation in accordance with an exemplary embodiment of the present invention.
Figure 10B:
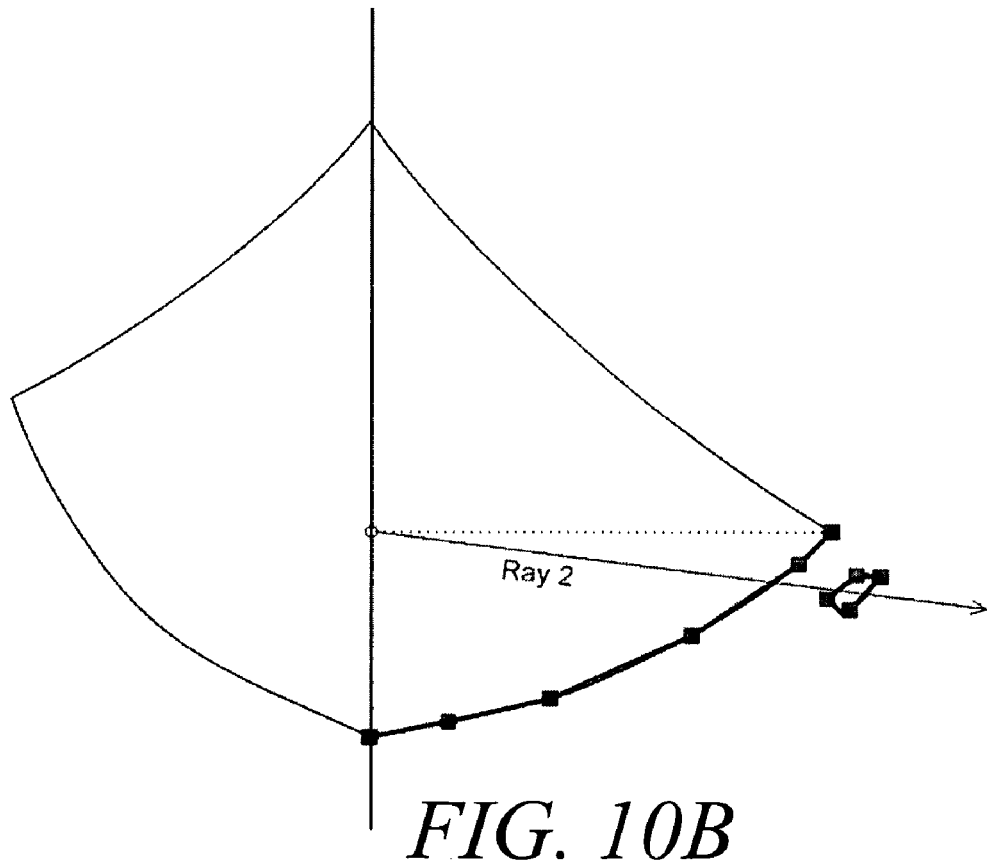

It should be noted that it is necessary for filtering to require that all the vertices of a triangle lie completely in one of the forbidden regions. For example, it is not enough for the vertices to lie in the union of the regions, because hyperplane separation works under the principle of convexity. The union of the regions is not itself a convex region, so even if all the vertices lie within it, it is possible that a point on the triangle may lie outside the region, and that point may be on the ray. FIGS. 10A and 10B illustrate exemplary Rays 1 and 2 which intersect sample line segments.

Now that the performance of a general type gamut operation, as well as the specific gamut operations of check gamut, get cusp and ray intersect have been described, a description of additional considerations for gamut operations will be provided.

One such consideration relates to gamut operations that are hue constrained, or those gamut operations which only consider variables within one hue plane (e.g., the get cusp operation). For certain hue angles within a hue range, the gamut boundary may be tangential to the hue plane. As such, a change is effected in the topological structure of the hue slices.

Figure 11A:
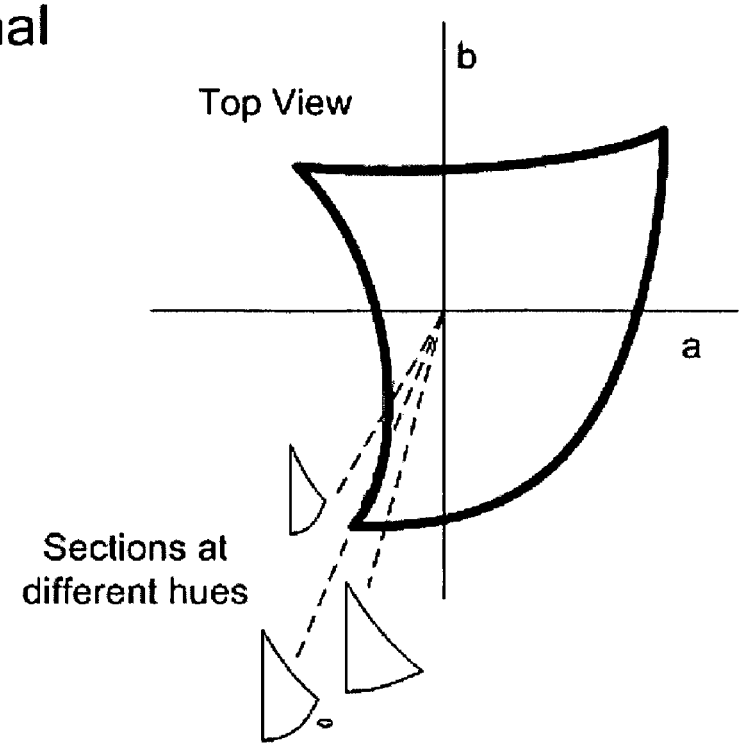
FIGS. 11A and 11B illustrate a general explanation for performing a hue smoothing operation in accordance with an exemplary embodiment of the present invention.

FIG. 11A depicts that as the hue plane sweeps across a hue range, an "island" can emerge and submerge. This change in topology will likely cause hue specific operations to be discontinuous. For example, the get cusp operation will likely change abruptly as the hue angle changes across this range.

Since it is desirable to preserve hue in certain GMAs such as SGCK, and such GMAs require gamut operations such as get cusp, the original gamut boundary triangles should preferably be hue smoothed before performing the operation. A hue smoothed set of the gamut boundary triangles is a set of gamut boundary triangles having two main properties. First, the boundary of a new "gamut", which may not correspond to the actual device gamut, is formed which contains the gamut defined by the original set of triangles. In addition, the triangles in the new set are bound away from being parallel to the hue planes.

Figure 11B:
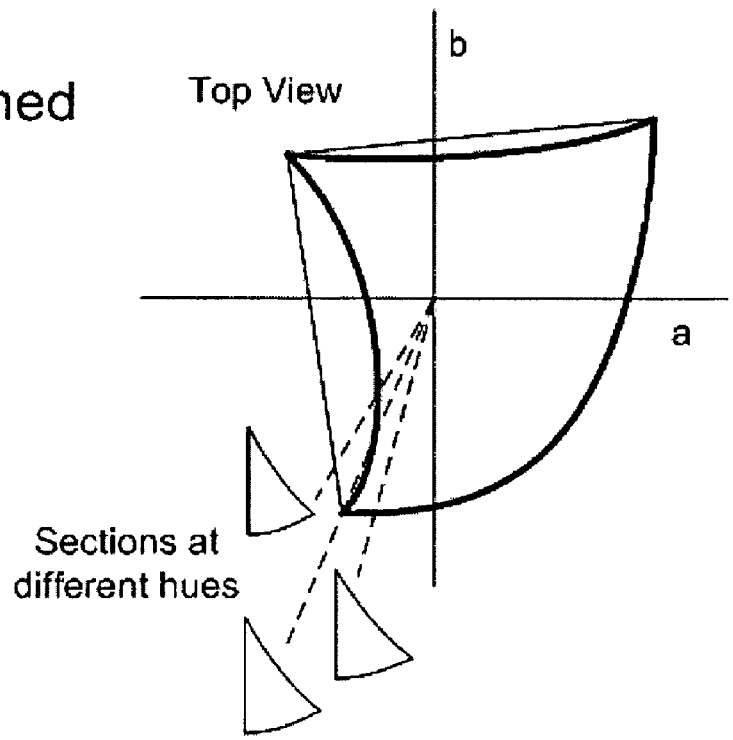

One practical way to obtain a hue smoothed set of triangles is to take the convex hull of the original vertices of the collection of gamut boundary triangles. For example, FIG. 11B illustrates that the hue slices of the convex hull vary smoothly in the problematic hue range without sudden change in topology.

Another consideration for gamut operations relates to the check gamut operation. As noted above, the check gamut operation determines whether a given color in color appearance space is inside the gamut boundary of a color device. The minimum color difference operation is a common gamut mapping strategy which uses the check gamut operation.

The minimum color difference operation calculates, in a case where a color input value is not within the gamut boundary, a point within the gamut boundary which is nearest to the color input value. In other words, if the color input value is in gamut, the minimum color difference operation does nothing.

However, if the color input value is out of gamut, the color input value is projected to the nearest point on the gamut boundary.

The keyword "nearest" is defined by which color difference equation is used. To reduce complexity and improve speed of the computation, the Euclidean distance of a chosen color appearance space, or a variant of thereof, can be used as the color difference metric. The advantage of the Euclidean metric is that it is compatible with the dot product of the color appearance space, which allows for the use of linear algebra. More specifically, if a dot product is defined in the color appearance space, then a distance can be defined as the square root of the dot product of the difference vector with itself. A dot product of two (column) vectors u and v can generally be defined by a positive definite 3×3 matrix A, such that:

$$u \cdot v = u^T A v \qquad \text{(Equation 9)}$$

In this equation, the right hand side is the usual matrix multiplication. If A is the identity matrix, the standard dot product can be recovered. In practice, if Jab is the color space, the components should not be mixed up, so that a diagonal matrix other than the identity matrix may be used. In addition, it may be preferred to keep the scale on a and b unchanged so that the measure of hue is preserved. As such, a useful variation of the standard Euclidean dot product is:

$$w_J*(\text{J component of u})*(\text{J component of v}) + (\text{a component of u})*(\text{a component of v}) + (\text{b component of u})*(\text{b component of v}) \qquad \text{(Equation 10)}$$

In Equation (10), $w_J$ is a pre-determined positive number. Alternatively, $w_J$ can vary with the input query point, as follows:

$$w_J = w_J(\text{queryPoint}) \qquad \text{(Equation 11)}$$

The end result is a measure of distance that is asymmetric with respect to the two points, and with different relative weights on lightness and chroma/hue as the input query point varies. This dependency on the input points is seen to be in accordance with the more commonly used, non-dot product based color difference equations, such as Delta-E 94. In addition, the following weight function may be useful:

$$w_J = k_2 - k_1(C - C_{max})^n \qquad \text{(Equation 12)}$$

Figure 12:
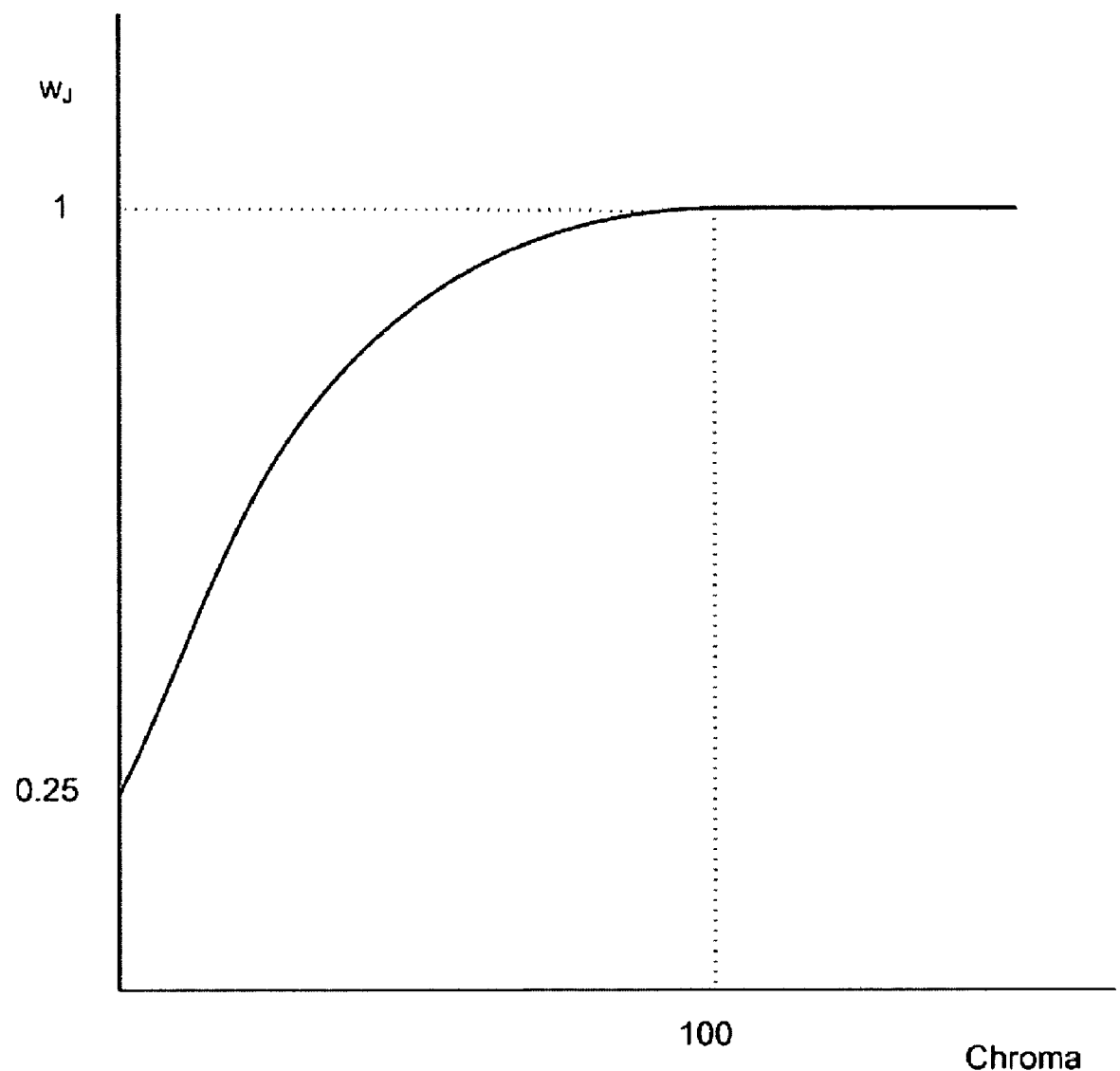
FIG. 12 is an exemplary graph depicting a relationship between weight and chroma for a minimum color difference operation.

In Equation (12), $k_2=1$, $k_1=0.75/(C_{max})^n$, $C_{max}=100$, $n=2$ and C is the smaller of chroma of the query point and $C_{max}$, so that a weight of 0.25 is put on the J term when chroma is zero, and a weight of 1 when chroma is 100 or larger. The trend of putting less weight on J when chroma is small, more weight on J when chroma is large is seen to be in accordance with the Delta-E 94 color difference formula, as well as other known formulas. FIG. 12 is an exemplary graph depicting a relationship between weight and chroma for a minimum color difference operation.

In this exemplary embodiment, the Jab color space is used. It is still computationally demanding to search through all the boundary triangles and determine the closest point in the Euclidean metric. A simple approach to make this process as efficient as possible is described below, without introducing additional assumptions that may speed up the process but also end up in only an approximate answer. However, it may be beneficial to first provide a description of the geometrical procedure of projecting a point onto a given triangle.

In projecting a point onto a given triangle, an orthogonal projection onto the infinite plane containing the triangle is performed. The shortest distance of the query point from the plane can be done in two steps. First, the unit normal vector to the triangle is calculated. Second, the dot product is calculated of the unit normal vector and a vector formed from the query point and a point on the triangle (e.g., one of its vertices). Because the normal vector has unit length, the absolute value of this dot product is the distance of the query point from the plane.

The projected point may not be the answer, because it may lie outside the triangle. So, a check should be performed. The calculation is equivalent to calculating the barycentric coordinates of the projected point relative to the triangle. If the projected point is determined to be inside the triangle, it is the answer. If not, the closest point is achieved on one of the edges of the triangle. Accordingly, a search is performed on each of the 3 edges. Determining the projection of the query point onto an edge is a similar process when compared to projection onto the triangle, only 1 dimension lower. Accordingly, such projection will not be discussed at length at this point. An orthogonal projection is first calculated. If the projected point lies on the edge, it is the answer. If not, the closest point is achieved on one of the two end points. Accordingly, a search is performed on the two end points, which is a matter of calculating the distance of query point from each one, and comparing which one is smaller.

It should be noted that there is a lot of repeated searching when all of the triangles are considered. The reason for this is because an edge is always shared by 2 triangles, and a vertex shared by at least 3 edges. In addition, there is not much interest in finding the closest point to one particular triangle. Instead, the interest lies in finding the closest point to the whole gamut boundary, although one particular triangle would clearly be the one that this is achieved.

In short, there are 2 strategies that can be implemented to speed up the search. First, each vertex should be processed at most once, and each edge should be processed at most once. Second, at any point in the search, a best candidate with the corresponding best distance should be noted. If a triangle can be determined by a quick check that it is not capable of giving a better distance, there is no need to continue the calculation further. The closest point and distance for this triangle are not needed.

Figure 13:
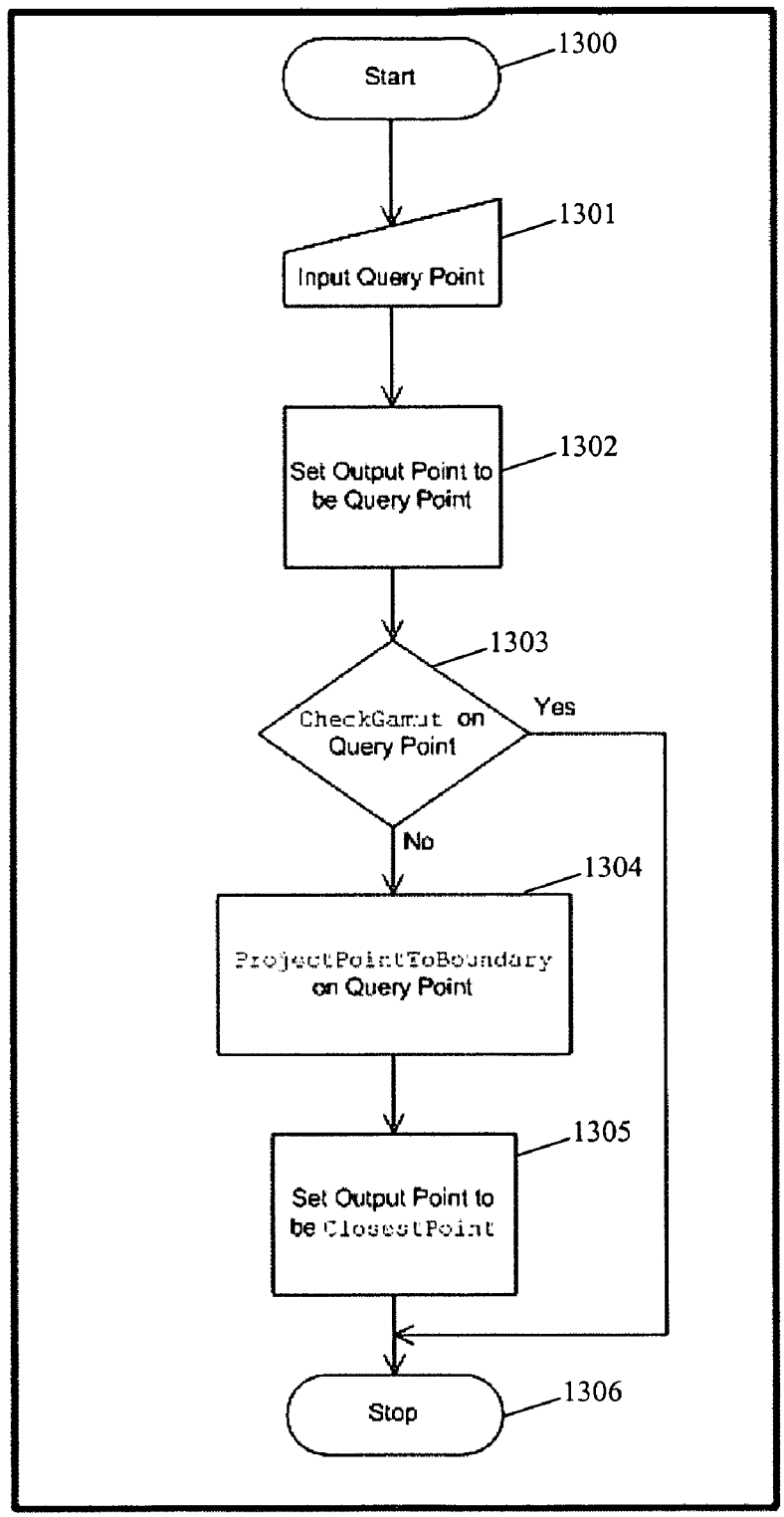
FIG. 13 is a flowchart illustrating the general flow of logic for a minimum color difference operation in accordance with an exemplary embodiment of the present invention.

Referring to FIG. 13, a flowchart illustrating the general flow of logic for a minimum color difference operation in accordance with an exemplary embodiment of the present invention is shown. Following start bubble 1300, and for a query point 1301, an output point is initialized to the query point (block 1302). The check gamut operation is then used on the query point to determine whether the query point is within the gamut boundary (decision diamond 1303). If the point is in gamut, no further calculation is needed, and the process ends (end bubble 1306). If the point is out of gamut, then the point is projected by performing a ProjectPointToBoundary routine on the query point (block 1304). The output point is then set to a ClosestPoint value (block 1305), and the process ends (end bubble 1306).

Figure 14:
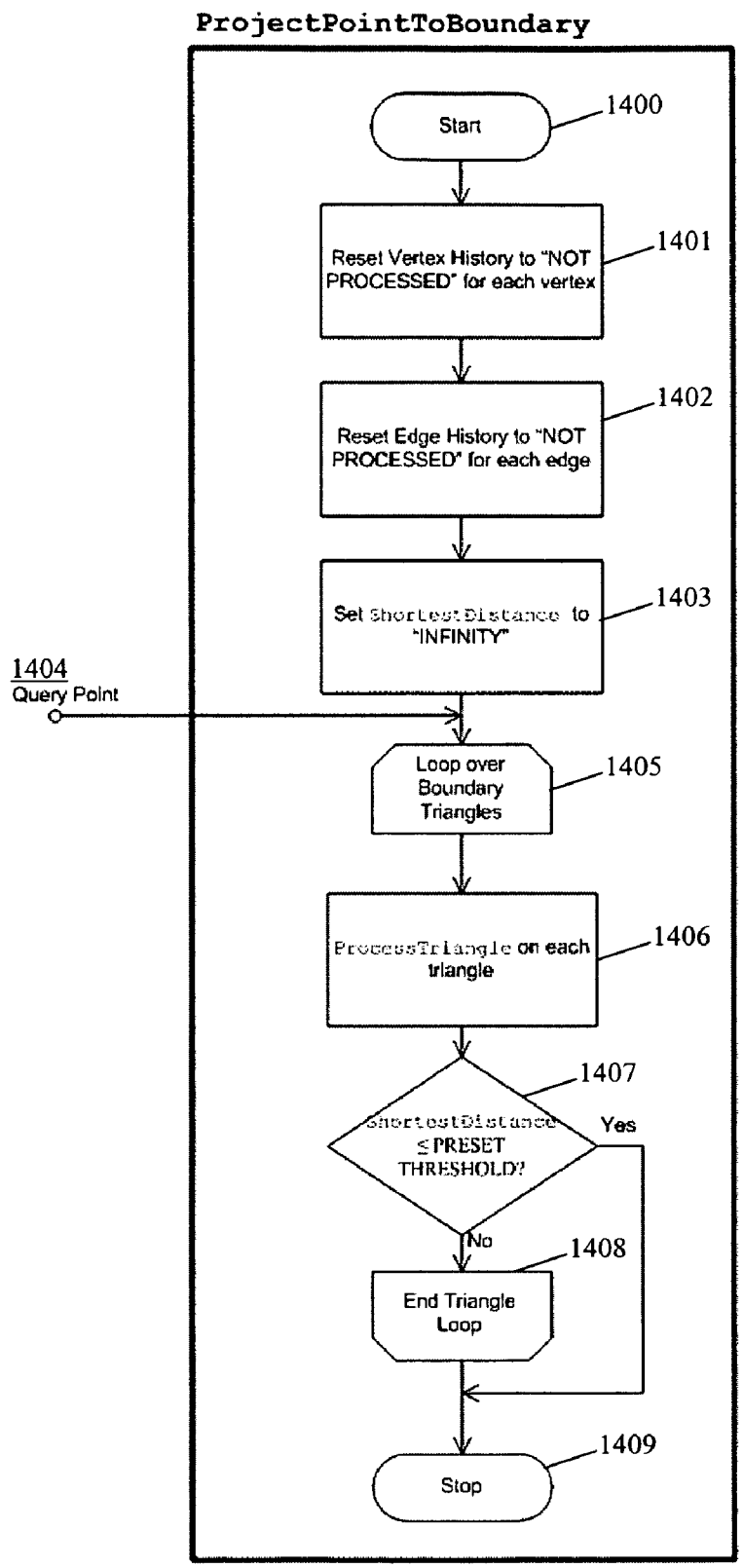
FIG. 14 is a flowchart illustrating the flow of logic for a ProjectPointToBoundary routine for a minimum color difference operation in accordance with an exemplary embodiment of the present invention.

Referring now to FIG. 14, a flowchart illustrating the flow of logic for the ProjectPointToBoundary routine (block 1304 of FIG. 13) for the minimum color difference operation in accordance with an exemplary embodiment of the present invention is shown. At this point, it can be assumed that the following values have been pre-computed: (a) a normal vector to each Gamut Boundary Triangle with respect to the standard dot product; and (b) a vertex list and edge list in addition to the gamut boundary triangle list.

All of these values are constant overhead, and would likely have diminishing cost if sufficient queries to the gamut boundary are made (which is usually the case when building a transform LUT from one device to another, where there are only 2 fixed gamuts and the transform LUT runs through points on the uniformly sampled grid). It is at least a curiosity why the normal vectors are pre-computed with respect to the standard dot product, whereas the notion of perpendicularity will be based on the weighted dot product, which depends on the query point as explained above. The reason for this is because a normal vector with respect to the weighted dot product can be obtained relatively easily from the normal vector with respect to the standard dot product: If no is a normal vector with respect to the standard dot product, then:

$$n = ((J \text{ component of } n_0)/w_J, a \text{ component of } n_0, b \text{ component of } n_0) \quad \text{(Equation 13)}$$

Equation (13) is normal to the triangle with respect to the weighted dot product. Because of this relationship, it is still beneficial to pre-compute $n_0$ even though it needs to be adjusted based on the query point.

Following start bubble 1400 of FIG. 14, the processed history of the vertices are reset (block 1401) and the processed history of the edges are reset (block 1402). The processed history of the vertices and edges are tables of boolean flags that track whether a vertex or edge has been visited before. The tables should preferably be reset for every new query point. The variable ShortestDistance is also set to "INFINITY", which in practice is the maximum encoded value in the floating point number system used (block 1403). A search loop is then performed (loop blocks 1405 and 1408), searching for the closest point from each triangle via a call to a ProcessTriangle routine (block 1406), which will be discussed in more detail with reference to FIG. 15. ProcessTriangle is the actual routine to update the ShortestDistance variable and is in the critical loop.

One optimization is to stop when a result is good enough. After each call to ProcessTriangle, ShortestDistance can be examined and a determination made as to whether the result meets a pre-defined threshold (decision diamond 1407). If the result satisfies the pre-defined threshold, the loop can stop (end loop block 1408), and the process ends (end bubble 1409). It should be noted that the pre-defined threshold is dependent on the color space used, and also on the required accuracy of the color imaging system. For normal applications, unnecessary extra work should preferably not be performed if the color difference is below what can be discerned by human vision. For example, in most uniform color spaces or color appearance spaces, this color difference is 1. However, other considerations, such as accuracy of intermediate calculations, may dictate that this threshold be considerably smaller than 1. A threshold value of 0.005 has been found that works well with this implementation.

Figure 15:
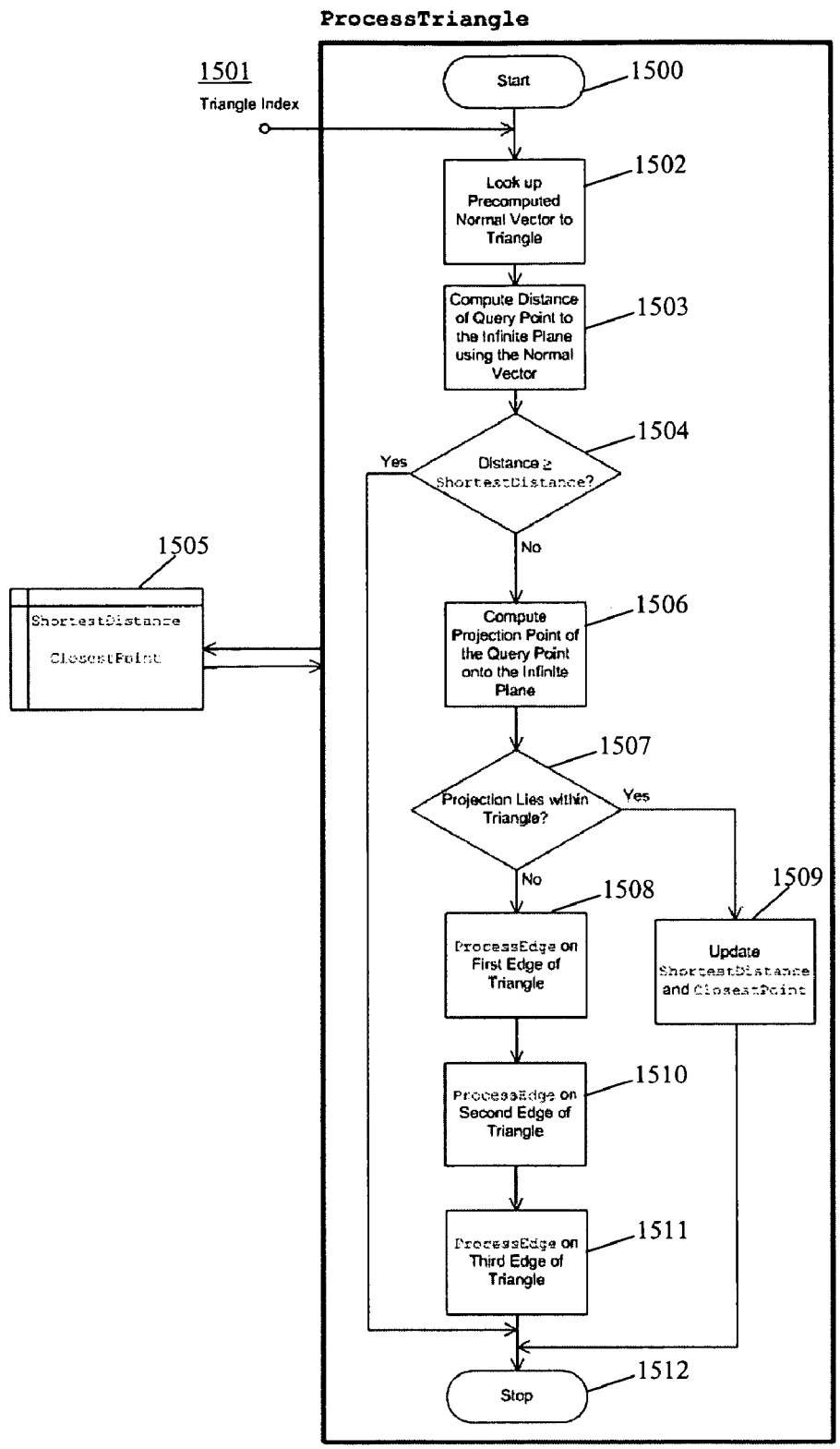
FIG. 15 is a flowchart illustrating the flow of logic for a ProcessTriangle routine for a minimum color difference operation in accordance with an exemplary embodiment of the present invention.

Referring now to FIG. 15, a flowchart illustrating the flow of logic for a ProcessTriangle routine (block 1406 of FIG. 14) for a minimum color difference operation in accordance with an exemplary embodiment of the present invention is shown. The ProcessTriangle routine implements the second general strategy described above for performing a minimum color difference operation. More specifically, a best candidate with the corresponding best distance is noted, and if a triangle can be determined by a quick check that it is not capable of giving a better distance, there is no need to continue the calculation further.

Following start bubble 1500, a normal vector to the triangle is obtained from the pre-computed "wrong" normal vector (block 1502). A distance is computed of the query point to the infinite plane containing the triangle by forming the dot product of the unit normal vector and the queryvector, the vector being from one of the vertices of the triangle, vertex1, to the query point, queryPoint (block 1503), as follows:

$$\text{queryvector} = \text{queryPoint} - \text{vertex1} \quad \text{(Equation 14)}$$

$$\text{distance} = |\text{normalVector} \cdot \text{queryvector}|/\|\text{normalVector}\| \quad \text{(Equation 15)}$$

This is a relatively inexpensive calculation if the square of distance is used, so that taking the square root can be avoided. The distance will be needed anyway if further calculations are to be carried out. A determination is then made if the distance is greater than or equal to a current best distance, Shortest-Distance (decision diamond 1504). If the distance is not less than ShortestDistance, this triangle will likely not produce a better distance, because it will not give a better distance than the plane containing it. In this case, the process ends (end bubble 1512), and control is returned to the triangle loop of FIG. 14. If the distance is smaller than ShortestDistance, then there is a potentially closer point, provided that the point lies inside the triangle. Additional calculations using linear algebra are used to determine the point (block 1506). In particular, if the other two vertices of the triangle are vertex2 and vertex3, then basis vectors firstBasisVector and secondBasisVector can be calculated as follows:

$$\text{firstBasisVector} = \text{vertex2} - \text{vertex1} \quad \text{(Equation 16)}$$

$$\text{secondBasisVector} = \text{vertex3} - \text{vertex1} \quad \text{(Equation 17)}$$

The linear system of equations to solve for unknowns u and v is:

$$\text{firstBasisVector} \cdot \text{queryvector} = \\ (\text{firstBasisVector} \cdot \text{firstBasisVector})u + \\ (\text{firstBasisVector} \cdot \text{secondBasisVector})v \quad \text{(Equation 18)}$$

$$\text{secondBasisVector} \cdot \text{queryvector} = \\ (\text{secondBasisVector} \cdot \text{firstBasisVector})u + \\ (\text{secondBasisVector} \cdot \text{secondBasisVector})v \quad \text{(Equation 19)}$$

In addition, the conditions for the projected point to lie inside the triangle are:

$$0 \leq u \leq 1, \ 0 \leq v < 1 \text{ and } u+v \leq 1 \quad \text{(Equation 20)}$$

After this calculation, a determination is made as to whether the projected point lies within the triangle (decision diamond 1507). If so, then a new closest point has been found, and the distance that was calculated at the beginning becomes the new shortest distance. In this case, the ShortestDistance and ClosestPoint variables are updated (block 1509). If the projected point lies outside the triangle, there is still chance that a closer point can be found on the triangle's edges. Accordingly, a ProcessEdge routine is called on each of the 3 edges (blocks 1508, 1509 and 1511). The process then ends (end bubble 1512).

Figure 16:
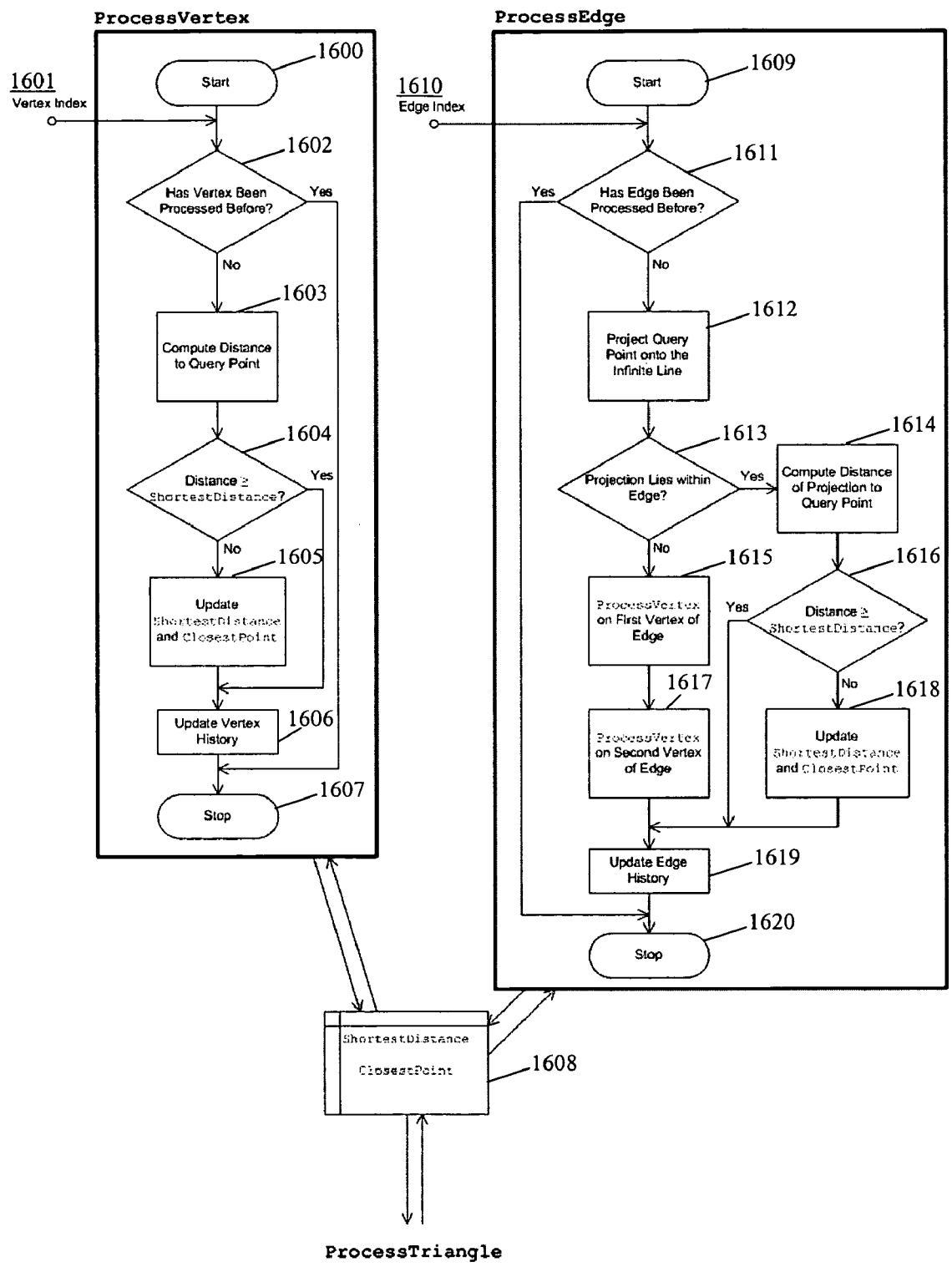
FIG. 16 is a flowchart illustrating the flow of logic for a ProcessEdge routine and a ProcessVertex routine for a minimum color difference operation in accordance with an exemplary embodiment of the present invention.

Referring now to FIG. 16, a flowchart illustrating the flow of logic for ProcessEdge routine and a ProcessVertex routine for a minimum color difference operation in accordance with an exemplary embodiment of the present invention is shown.

The ProcessEdge routine (block 1508 of FIG. 15) implements the first general strategy described above for performing a minimum color difference operation. More specifically, each edge will be processed at most once. Following start bubble 1609, a determination is made as to whether the edge has been processed before (decision diamond 1611). If so, no further action is taken, and the process ends (end bubble 1620). If not, the orthogonal projection of the query point onto the infinite line containing the edge is calculated (block 1612). The linear algebra involved in the calculation is similar that of the triangle case, but simpler. Accordingly, the linear algebra will not be described at length at this point. A determination is then made as to whether the projected point lies within the edge (decision diamond 1613). If the projected point lies within the edge, the distance of the projected point from the query point is determined (block 1614). A determination is then made as to whether this distance is smaller than ShortestDistance (decision diamond 1616). If so, a new closest point has been found, and both ShortestDistance and ClosestPoint are updated (block 1618). If the projected point lies outside the edge, a ProcessVertex routine is called on the two end points (block 1615 and 1617). Before returning control, the edge history is updated so that this edge is marked as "PROCESSED" (block 1619). The process then ends (end bubble 1620).

The ProcessVertex routine (blocks 1615 and 1617 of FIG. 16) also implements the first general strategy described above for performing a minimum color difference operation. More specifically, each vertex will be processed at most once. Following start bubble 1600, a determination is made as to whether the vertex has been processed before (decision diamond 1602). If so, no further action is taken, and the process ends (end bubble 1607). If not, the distance of the vertex from the query point is calculated (end block 1603). A determination is then made as to whether the distance is smaller than ShortestDistance (decision diamond 1604). If so, both ShortestDistance and ClosestPoint are updated (block 1605). The vertex history is then updated so that this vertex is marked as "PROCESSED" (block 1606), and the process ends (end bubble 1607).

Turning back to FIG. 14, when the outer control loop (loop blocks 1405 and 1408) has either exhausted all the triangles, or exited because the color difference threshold has been met, the variable ClosestPoint is accessed. This is the result of the minimum color difference mapping gamut operation. Optionally, a user can also retrieve ShortestDistance if the user is interested in how far the mapped color is from the query color.

Figure 17:
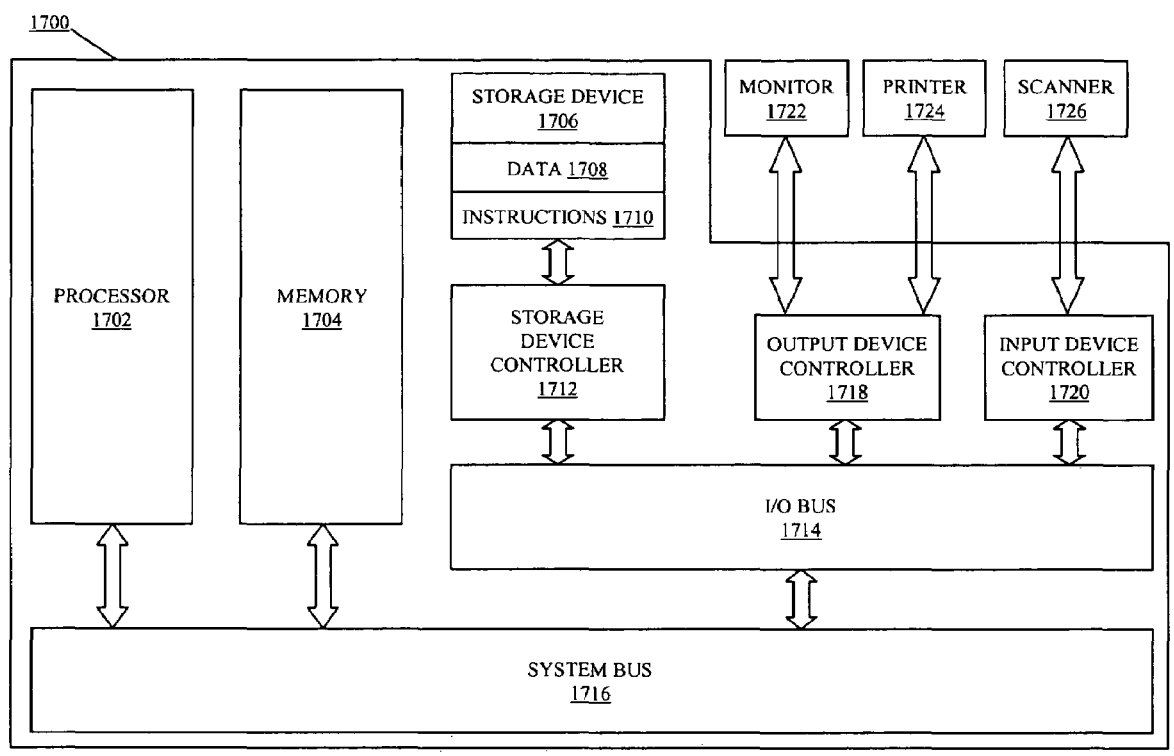
FIG. 17 is a block diagram illustrating a data processing system which may be used in accordance with an exemplary embodiment of the present invention.

FIG. 17 is a block diagram illustrating a data processing system which may be used in accordance with an exemplary embodiment of the present invention. The data processing system 1700 includes a processor 1702 coupled to a memory 1704 via system bus 1716. The processor 1702 is also coupled to external Input/Output (I/O) devices via the system bus 1716 and an I/O bus 1714. A storage device 1706 having computer system readable media is coupled to the processor 1702 via a storage device controller 1712, the I/O bus 1714 and the system bus 1716. The storage device 1706 is used by the processor 1702 to store and read data 1708 and program instructions 1710 used to implement color conversion using the color device model as described above. The processor 1702 may be further coupled to color output devices, such as computer display 1722 and color printer 1724, via an output device controller 1718 coupled to the I/O bus 1714. The processor 1702 may also be coupled to a color input device 1726, such as color scanner, via an input device controller 1720.

In operation, the processor 1702 loads the program instructions from the storage device 1706 into memory 1704. The processor 1702 then executes the loaded program instructions 1710 to perform gamut mapping operation(s) for a color device.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for performing a type of gamut operation for a color device given a color input value, the color device being characterized by a gamut boundary comprising a collection of gamut boundary triangles, the method comprising the steps of:
   determining boundary line elements that correspond to a subset of the collection of gamut boundary triangles,
   wherein the subset of the collection of gamut boundary triangles excludes triangles based on the type of gamut operation and the color input value,
   and wherein each boundary line element represents a line segment defined by an intersection of one of the gamut boundary triangles within the subset of the collection of gamut boundary triangles with a hue plane, and wherein the hue plane is within the gamut boundary and based on the color input value; and
   determining a result for the gamut operation using one or more of the determined boundary line elements.

2. A method according to claim 1, wherein the color input value is a query color, and wherein the type of gamut operation is a check gamut operation in which the determined result is an indication of whether the query color falls within the gamut boundary of the color device.

3. A method according to claim 2, wherein an upward ray is calculated that begins at the query color and that travels in an upward direction relative to the gamut boundary.

4. A method according to claim 3, wherein the subset of the collection of gamut boundary triangles excludes triangles prior to determining the boundary line elements, by a filtering process including:
   determining, for each gamut boundary triangle within the collection of gamut boundary triangles, whether the upward ray intersects a box which bounds the vertices of the gamut boundary triangle; and
   removing the gamut boundary triangles which do not intersect the upward ray.

5. A method according to claim 4, wherein the box which bounds the gamut boundary triangle is enlarged by a preset tolerance.

6. A method according to claim 2, wherein the step of determining a result comprises:
   tallying a number of boundary line elements that the ray intersects;
   determining, in a case where the number is odd, that the query color falls within the gamut boundary; and
   determining, in a case where the number is even, that the query color does not fall within the gamut boundary.

7. A method according to claim 1, wherein the color input value is a hue angle, and wherein the type of gamut operation is a get cusp operation in which the determined result represents a point on the gamut boundary having the hue angle, the point having a maximum chroma among all points on the gamut boundary having the hue angle.

8. A method according to claim 7, wherein a boundary line element is determined for a first one of the collection of gamut boundary triangles, and wherein the end points of the boundary line element are used to initialize a current maximum chroma value, and wherein a chroma value is computed for the vertices of each of the gamut boundary triangles within the collection of gamut boundary triangles.

9. A method according to claim 8, wherein the step of determining the boundary line elements that correspond to the subset of the collection of gamut boundary triangles comprises:
   comparing the current maximum chroma value with the computed chroma values of each gamut boundary triangle until one of the computed chroma values is greater than the current maximum chroma value; and
   determining a boundary line element for the gamut boundary triangle with a computed chroma value greater than the current maximum chroma value, wherein end points of the boundary line element are used to reset the current maximum chroma value if the end points correspond to a chroma which is greater than the current maximum chroma value,
   and wherein the comparing and determining steps are repeated for all of the gamut boundary triangles.

10. A method according to claim 9, wherein the step of determining a result comprises returning the end point of the boundary line element corresponding to the current maximum chroma value.

11. A method according to claim 1, wherein the color input value is an input ray which lies within a hue plane of the gamut boundary, and wherein the type of gamut operation is a ray intersect operation in which the determined result represents a point at which the input ray intersects the gamut boundary, the point having a maximum chroma among all points at which the input ray intersects the gamut boundary.

12. A method according to claim 11, wherein a color space of the color device is associated with color components, and wherein each color component defines a hyper-plane that divides a whole color space into two half spaces, and wherein a color component ray is calculated by projecting the input ray into one of the two half spaces for each color component.

13. A method according to claim 12, wherein the subset of the collection of gamut boundary triangles excludes triangles prior to determining the boundary line elements, by a filtering process including:
    determining, for each gamut boundary triangle within the collection of gamut boundary triangles, whether all of the vertices of the gamut boundary triangle lie within a half space which does not contain one of the color component rays; and
    removing the gamut boundary triangles having all vertices lying within a half space which does not contain one of the color component rays.

14. A method according to claim 13, wherein the half space which does not contain a color component ray is reduced by a preset tolerance value.

15. A method according to claim 11, wherein the step of determining a result comprises:
    calculating an intersection point for each of the boundary line elements with the input ray; and
    returning the intersection point with a largest chroma.

16. A method according to claim 1, wherein the intersection of one of the subset of the collection of gamut boundary triangles with the hue plane is calculated using integer values for geometrical consistency.

17. A method according to claim 1, wherein the intersection of one of the subset of the collection of gamut boundary triangles with the hue plane is calculated using a dot product of the vertices of the gamut boundary triangle and a quantized normal vector of the hue plane.

18. A method according to claim 17, wherein the dot product is cached.

19. A method according to claim 1, wherein in a case where the type of gamut operation confines input and output on a same hue plane, a hue smoothing step is applied to the collection of gamut boundary triangles prior to intersection with the hue plane.

20. A method according to claim 19, wherein the hue smoothing step is applied by taking the convex hull of the collection of gamut boundary triangles.

21. Computer-executable process steps stored on a computer readable medium, the computer-executable process steps for performing a type of gamut operation for a color device given a color input value, the color device being characterized by a gamut boundary comprising a collection of gamut boundary triangles, the computer-executable process steps comprising process steps executable to perform a method according to claim 1.

22. An apparatus for performing a type of gamut operation for a color device given a color input value, the color device being characterized by a gamut boundary comprising a collection of gamut boundary triangles, the apparatus comprising:
    a program memory for storing process steps executable to perform a method according to claim 1; and
    a processor for executing the process steps stored in the program memory.

23. A method for performing a minimum color difference mapping operation for a color device given a color input value, the color device being characterized by a gamut boundary comprising a collection of gamut boundary triangles, the method comprising the steps of:
    determining if the color input value is within the gamut boundary; and
    calculating, in a case where the color input value is not within the gamut boundary, a point within the gamut boundary which is nearest to the color input value,
    wherein calculations are not repeatedly performed for edges and vertices shared by any of the gamut boundary triangles within the collection of gamut boundary triangles,
    and wherein a best candidate point having a closest distance is maintained, and wherein calculations are not performed for gamut boundary triangles whose points are determined to have a distance further than that of the best candidate point.

24. Computer-executable process steps stored on a computer readable medium, the computer-executable process steps for performing a minimum color difference mapping operation for a color device given a color input value, the color device being characterized by a gamut boundary comprising a collection of gamut boundary triangles, the computer-executable process steps comprising process steps executable to perform a method according to claim 23.

25. An apparatus performing a minimum color difference mapping operation for a color device given a color input value, the color device being characterized by a gamut boundary comprising a collection of gamut boundary triangles, the apparatus comprising:
    a program memory for storing process steps executable to perform a method according to claim 23; and
    a processor for executing the process steps stored in the program memory.

26. A method according to claim 23, wherein the gamut boundary corresponds to a color space having a lightness component and other components, and wherein the point within the gamut boundary which is nearest to the color input value is calculated based on a distance, and wherein the distance is defined by applying a weight value to the lightness component of the color space and applying a unit weight to the other components of the color space.

27. A method according to claim 26, wherein the weight value depends only on the color input value.

28. A method according to claim 27, wherein the weight value depends on a chroma of the color input value, such that the weight value increases as the chroma of the color input value decreases, and the weight value decreases as the chroma of the color input value increases.

29. A method according to claim 26, wherein
    the color space is Jab, and wherein J represents the lightness component and a and b represent the other components, and wherein the distance is derived by an inner product defined by the equation:

wj*(J component of u)*(J component of v)+(a component of u)*(a component of v)+(b component of u)*(b component of v)

with wj representing the weight value, and u and v representing column vectors in the color space.

* * * * *